United States Patent [19]
Bilgutay

[11] 3,832,686
[45] Aug. 27, 1974

[54] BAR CODE FONT

[76] Inventor: Ilhan M. Bilgutay, 2440 Dupont Ave. S., Minneapolis, Minn. 55405

[22] Filed: May 11, 1972

[21] Appl. No.: 252,335

Related U.S. Application Data

[62] Division of Ser. No. 118,771, Feb. 25, 1971, Pat. No. 3,744,025.

[52] U.S. Cl. .................... 340/146.32, 340/146.3 A, 235/61.11 E
[51] Int. Cl. .......................................... G06m 9/18
[58] Field of Search ............... 340/146.3 A, 146.3 Z

[56] References Cited

UNITED STATES PATENTS

| | | | |
|---|---|---|---|
| 3,044,696 | 7/1962 | Feissel | 340/146.3 A |
| 3,303,469 | 2/1967 | Perotto | 340/146.3 Z |
| 3,585,589 | 6/1971 | Reilly | 340/146.3 Z |

OTHER PUBLICATIONS

H. Van Steenis, Error Correcting Bar Coded Font IBM Journal, Vol. 7, No. 1, p. 48, June 1964.

*Primary Examiner*—Raulfe B. Zache
*Assistant Examiner*—Robert F. Gnuse
*Attorney, Agent, or Firm*—Wayne A. Sivertson; Lew Schwartz

[57] ABSTRACT

An optical character reading system comprising a hand-held probe device for scanning a printed font to produce an output adapted for driving a printed readout display or producing digital inputs to data storage or computing apparatus. The font is comprised of bar code symbols which can form humanly recognizable alpha-numeric characters. At the tip of the probe device are means for transmitting a bright light and means for receiving reflected light at spaced apart windows. The light receiving means of each window is connected to an electrical signal producing element so that as the device scans over a series of characters, each window "sees" the reflective and non-reflective areas and output signals are produced which provide information as to the relative locations of reflective and non-relective areas and also the number of non-reflective edges passed during scanning and these signals provide input data to logic circuitry that includes means for compensating for variations in the direction of scanning or orientation of the probe with respect to the character block; means for identifying variables and characters of the printing font and for producing and storing representative data outputs and also error-checking components for assuring the accuracy of the data outputs.

17 Claims, 29 Drawing Figures

BAR CODE FONT

This is a division of application Ser. No. 118,771 filed Feb. 25, 1971, now U.S. Pat. No. 3,744,025.

BACKGROUND OF THE INVENTION

This invention relates to apparatus for scanning printed symbols or characters to produce a visual readout or data related to the symbols. More particularly, it relates to a unique printing font and a device capable of reading the font which is comprised of spaced apart bar portions that may be formed as humanly recognizable characters.

In the field of data collection, two techniques have evolved for performing character recognition. Magnetic ink character recognition (MICR) used extensively in the banking industry is capable of reading a highly sytlized special type font limited 10 characters. A limitation of readability and number of alphabetic characters severely restricted its use in other commercial and industrial applications.

A second technique for data collection known as optical character recognition (OCR) was used to some extent with complicated code symbols and expensive apparatus. However, such systems lacked the capability of collecting data from a media that could not be precisely prepared or well aligned for scanning and could not be brought to the scanning area. A need therefore developed for a portable scanning device having such capability.

Portable OCR devices heretofore developed for scanning and reading a printed font were operable only in conjunction with a coded or colored series of symbols or characters that could not be humanly recognized as alphanumeric characters. Also, such prior devices were limited in the number of characters that they could recognize. This prevented such devices from being useful in situations where visual recognition of the printed font by a person is also required and a full alphabetic font is essential. For example, in retail store operations it is desirable that the price of each item and possibly other information be indicated by recognizable printing and yet be readable electrically. This capability greatly facilitates the item by item recording and totalling of price and other data for all purchases by a customer as he passes through a check stand. It also enables accurate inventories of a large stock of items to be taken rapidly with a minimum of labor.

Another problem which heretofore prevented the developement of portable OCR devices was that of maintaining accuracy during scanning when the device was tilted or skewed to some degree with respect to a character block. Such excessive sensitivity would severely limit the use of the portable devices to highly skilled operators and even then the results would be unreliable unless a reliable checking or error detecting system could be provided.

BRIEF DESCRIPTION OF THE INVENTION

A general object of the present invention is to overcome the aforesaid problems and provide an apparatus including an optical character reading device that can scan a series of characters, either in the form of bar code symbols or humanly readable characters, derived therefrom and which will instantaneously produce outputs corresponding to these characters in the form of a visual readout display or as inputs to some data storing or computing device.

Another object of my invention is to provide an apparatus including a probe-like device that can be manipulated by hand for reading humanly recognizable characters and will produce accurate and reliable readout results even though the device may be tilted or skewed to a considerable degree with respect to the printed characters.

Another object of my invention is to provide an apparatus of the aforesaid type that can read a large number of characters rapidly, which will automatically check and recheck itself so that no output or readout will be produced unless it is accurate.

Another object of my invention is to provide an apparatus that is particularly rugged and maintenance free and is well adapted for ease and economy of manufacture.

Yet another object of my invention is to provide a unique printing font comprised of bar symbols of different widths arranged in combinations to form a large number of separately distinguishable characters which can be printed in either a code form or as humanly recognizable alpha-numeric characters.

Another object of my invention is to provide an optical reading system which will operate when the printing font is printed in a conventional manner without requiring special ink or paper.

Another object of my invention is to provide a printing font that can read by an optical scanning system and which may be printed for scanning with a density of nine to 10 alpha-numeric characers per inch.

One apparatus that accomplishes the aforesaid and other objects of my invention utilizes a unique printing font comprised of characters formed from generally parallel, spaced apart bar portions of different widths having a non-reflective surface and arranged in various combinations on a reflective background material. A probe-like device adapted to be hand-held and to travel along a path generally perpendicular to the character bar portions has a tip with four spaced apart windows. Each window has a reflective light receiving or pickup means and an adjacent light transmitting means. A light source supplies light to each transmitting means through a glass fiber light pipe. Each of the light receiving means is connected by light transmitting members to light responsive elements such as phototransistors within the probe which will produce an electrical output when impinging light reaches a threshold level. Thus, as the probe tip scans a series of characters, the light pickup means of its windows cause electrical outputs to be produced in accordance with their positions with respect to a character bar portion. These outputs from the phototransistors are furnished to logic circuitry which transforms the data to driving outputs for a visual or printing readout device or for some other apparatus such as a data storage or computing device on a business accounting machine. An inherent accuracy and versatility of my optical character reading system is made possible because the logic circuitry utilizes pulses generated as the probe windows or openings move from one reflective bar to an adjacent non-reflective bar during scanning. These "pulse rising" and "pulse-falling" signals produced at the edges of non-reflective bars are combined after they are counted and coded with signals representing the actual position of the various probe openings with respect to non-reflective bars at a given instant to provide the logic information used for identifying the characters of the font.

The logic circuitry of my system also uses such "pulse-rising" and "pulse falling" signals to identify reset characters used at the front and rear ends of every character block being scanned. These reset signals thus provide a means used by the logic circuitry for compensating for the direction of scan and orientation of the probe device with respect to the character block being scanned.

Therefore, additional objects of my invention are to provide an optical character reading system having a logic circuit that utilizes pulse rising and falling signals in the identification of characters; that produces accurate outputs despite the speed or direction of travel or the relative position of the probe with respect to a character block; and that also provides for error checking during each scanning operation so that erroneous outputs cannot be released even if the probe is held in a tilted or skewed position.

Other objects, advantages and features of my invention will become apparent from the following detailed description presented with the accompanying drawings:

FIG. 1 is a diagram showing the arrangement of the drawing sheets for the schematic block diagram of my system;

FIGS. 2A – 2F together comprise a schematic block diagram of an optical character reading system embodying the principles of the present invention;

DETAILED DESCRIPTION OF EMBODIMENTS

Figures 1, 2A:
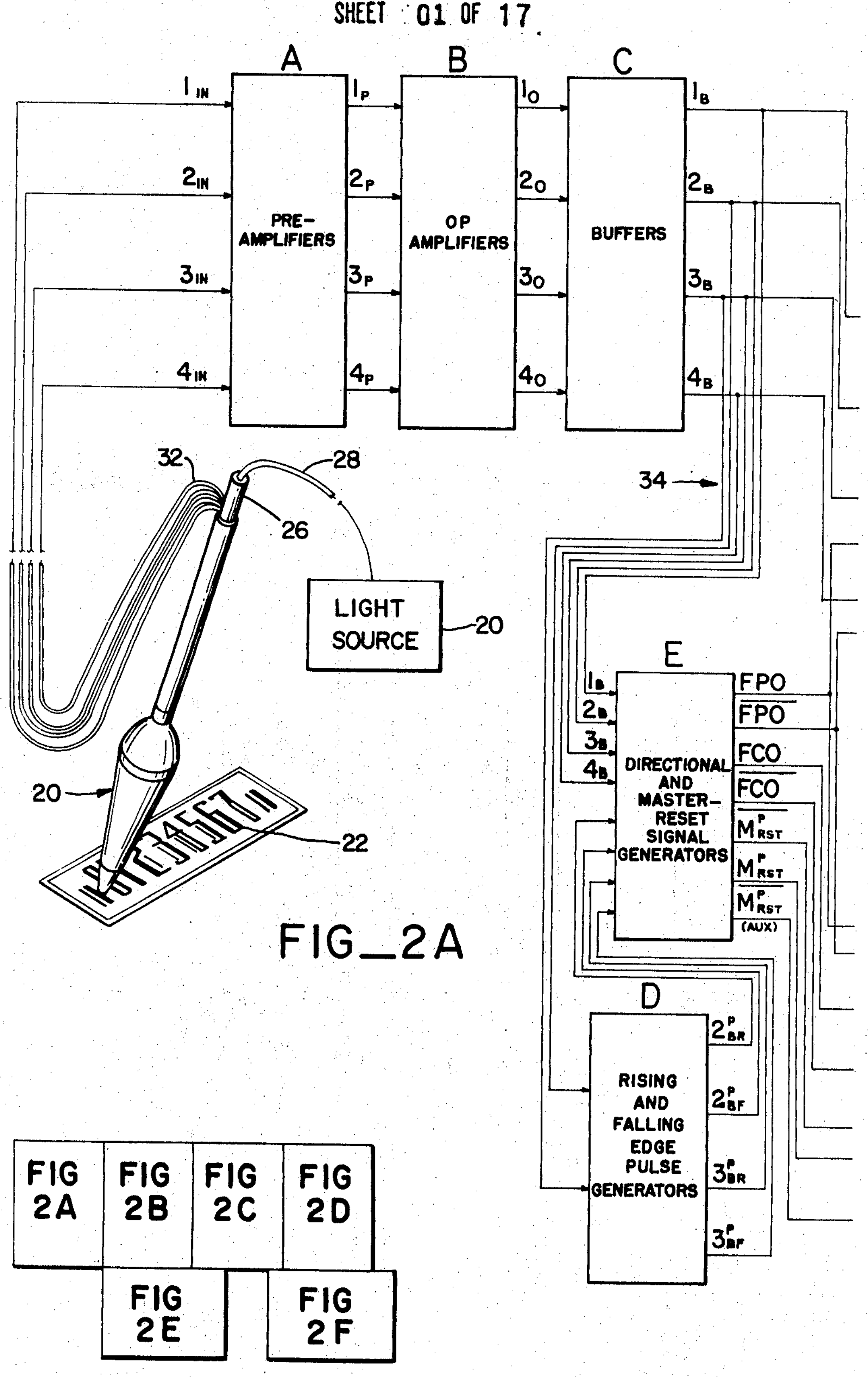
Figure 2B:
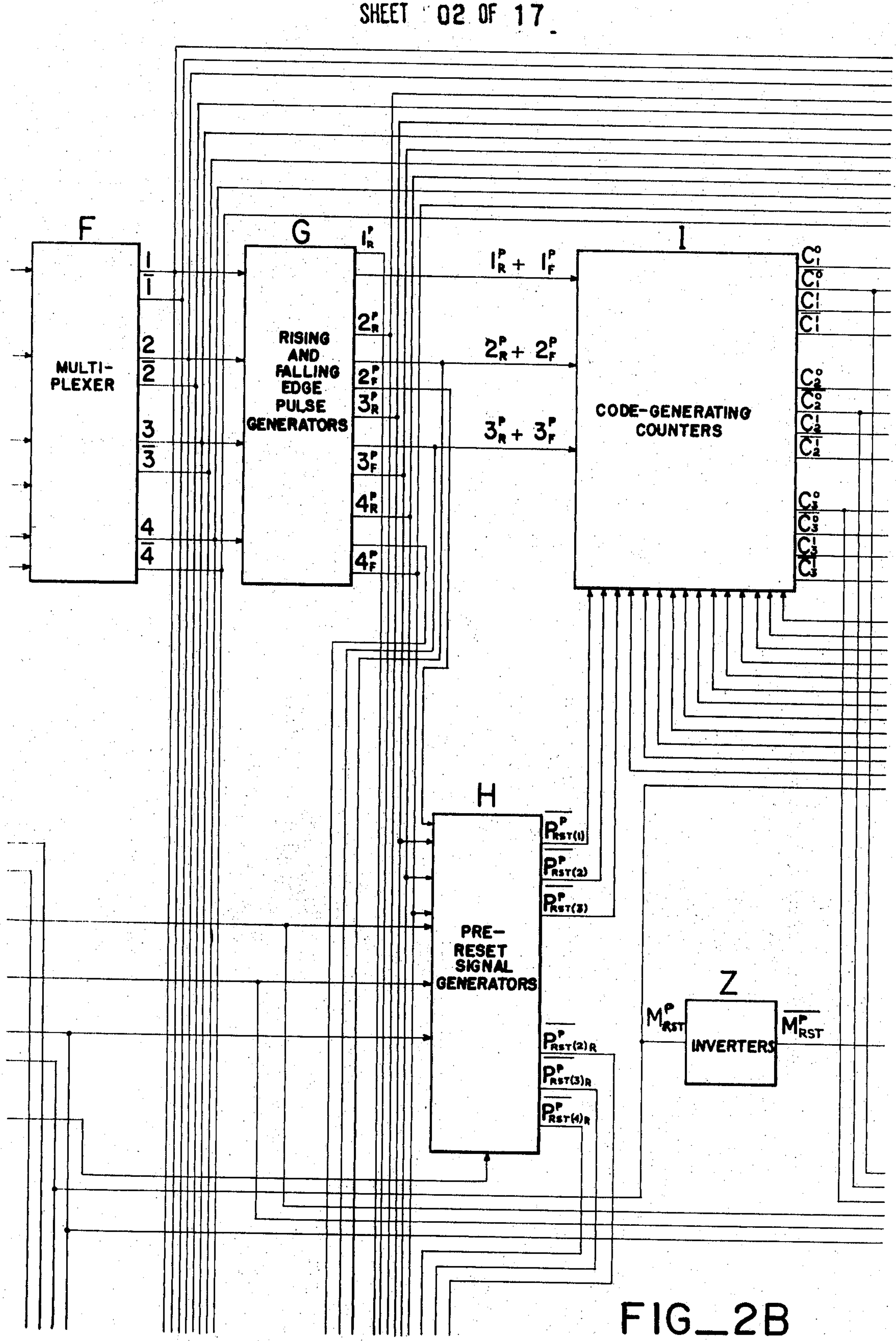
Figure 2C:
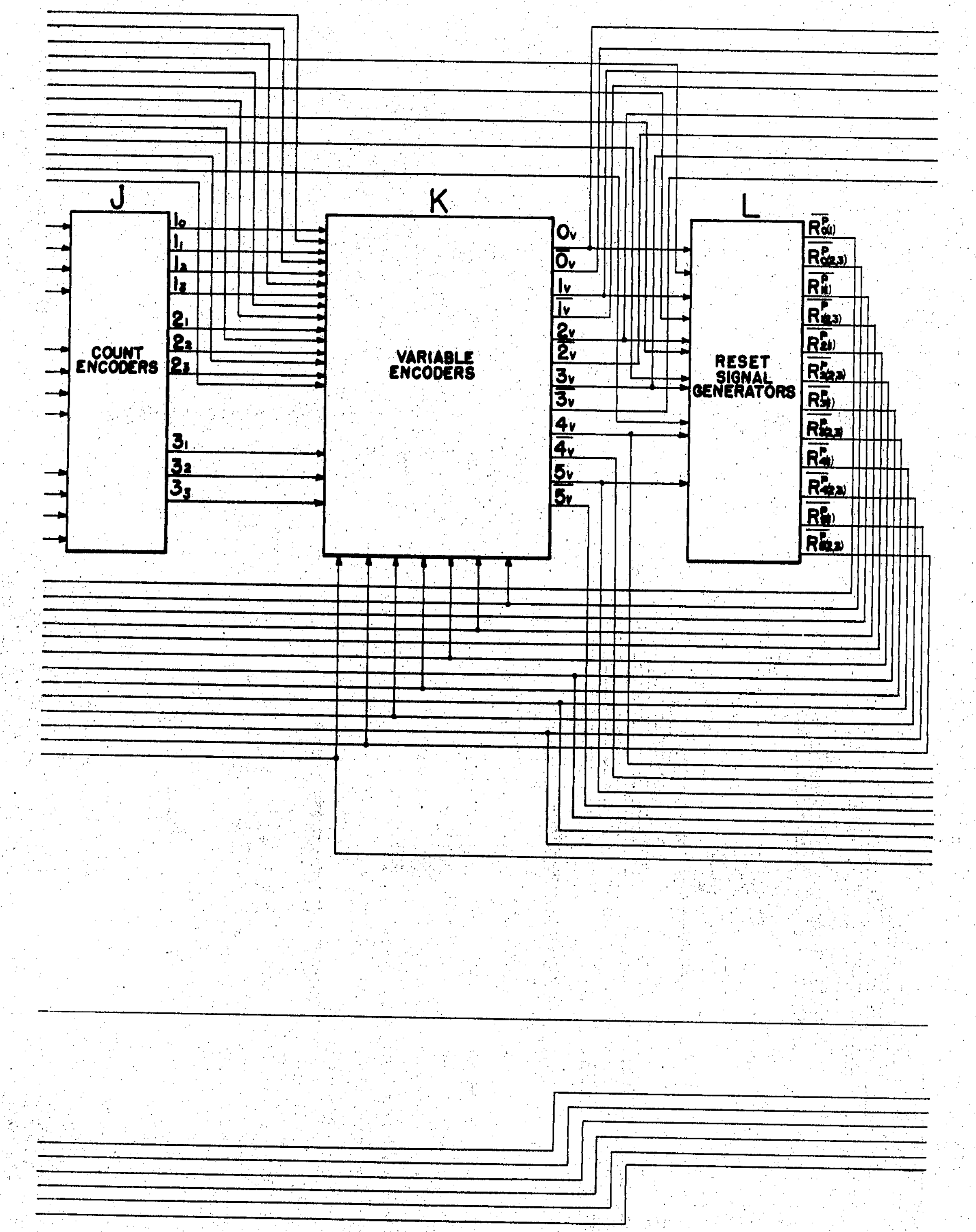
Figure 2D:
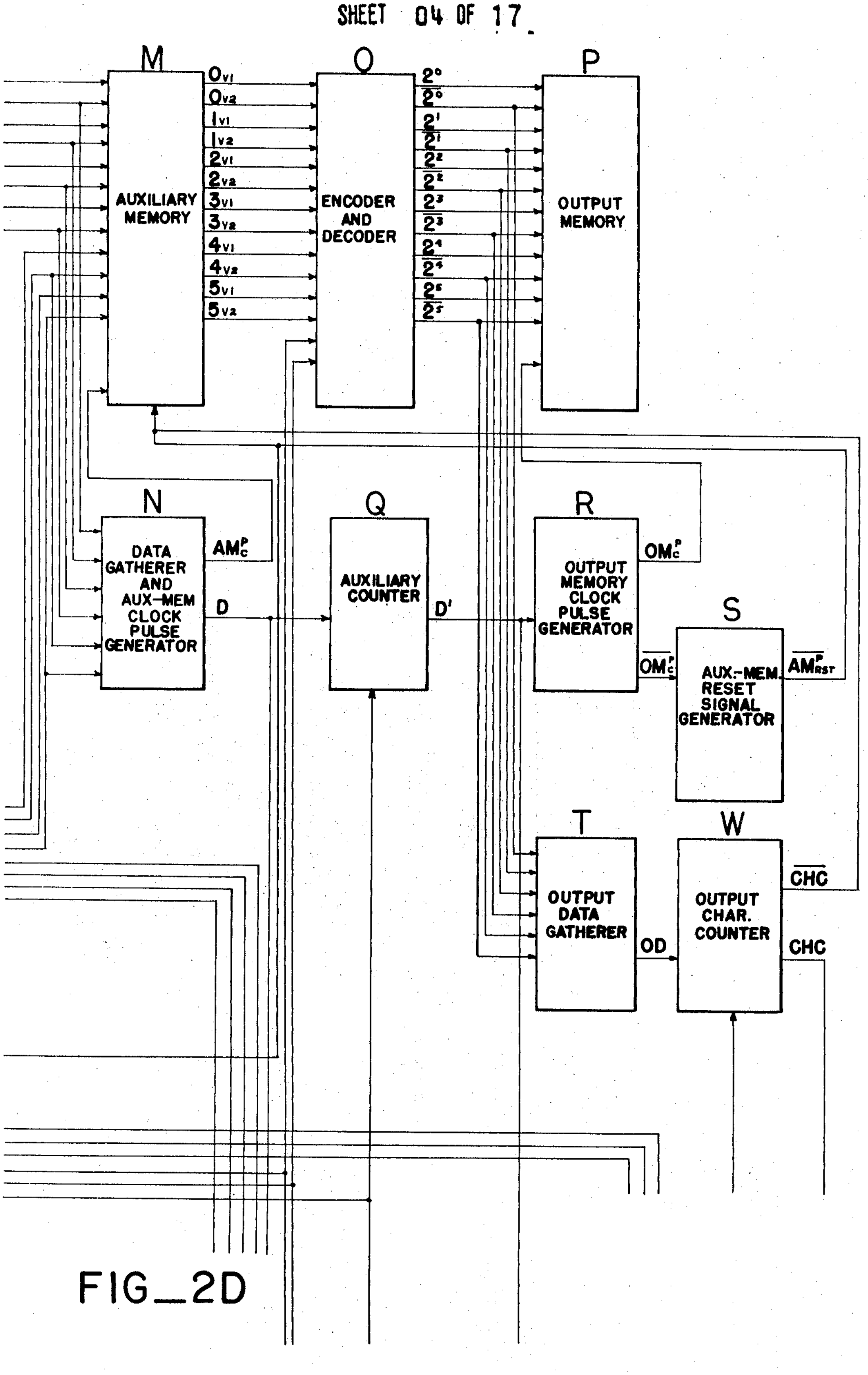
Figure 2E:
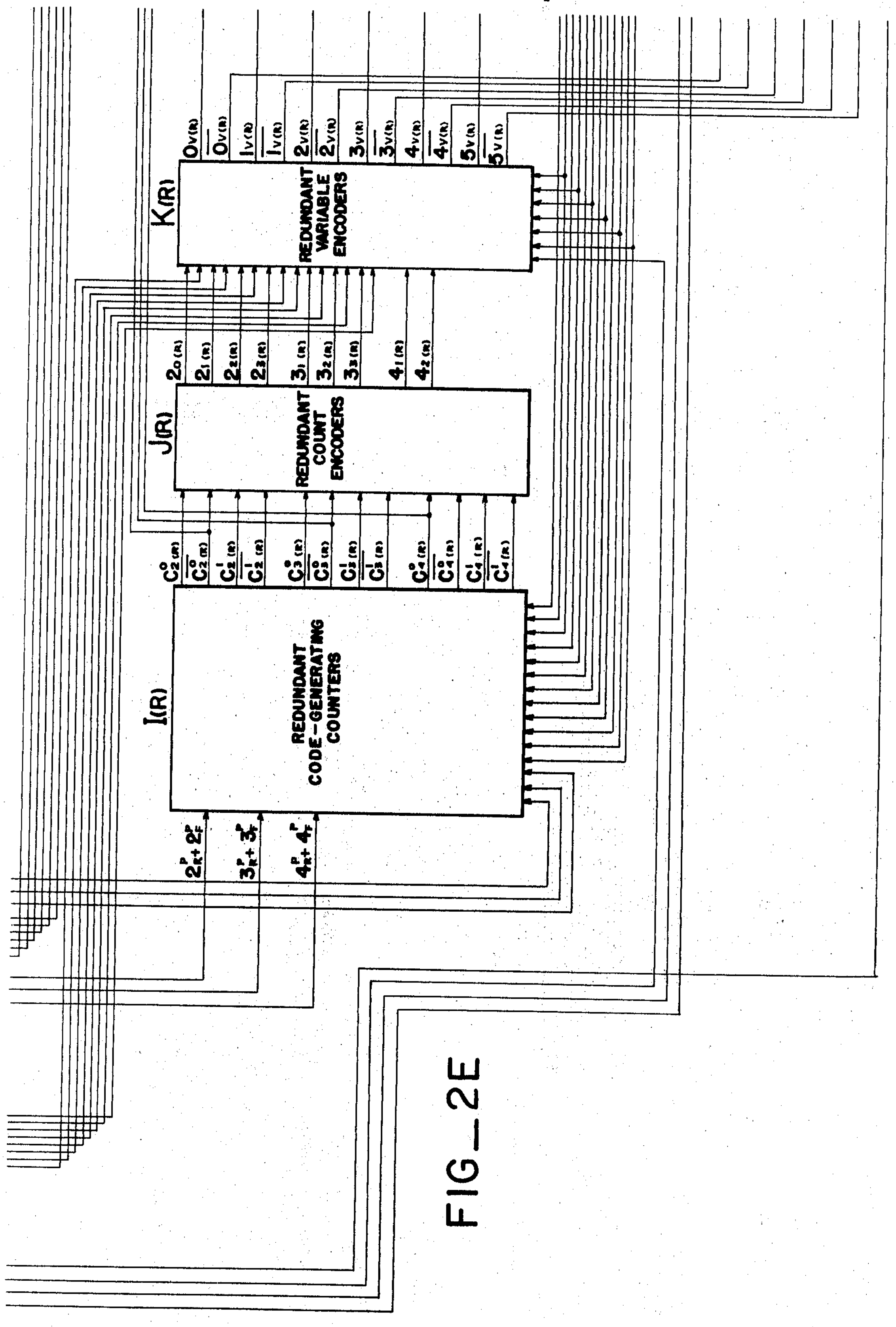
Figure 2F:
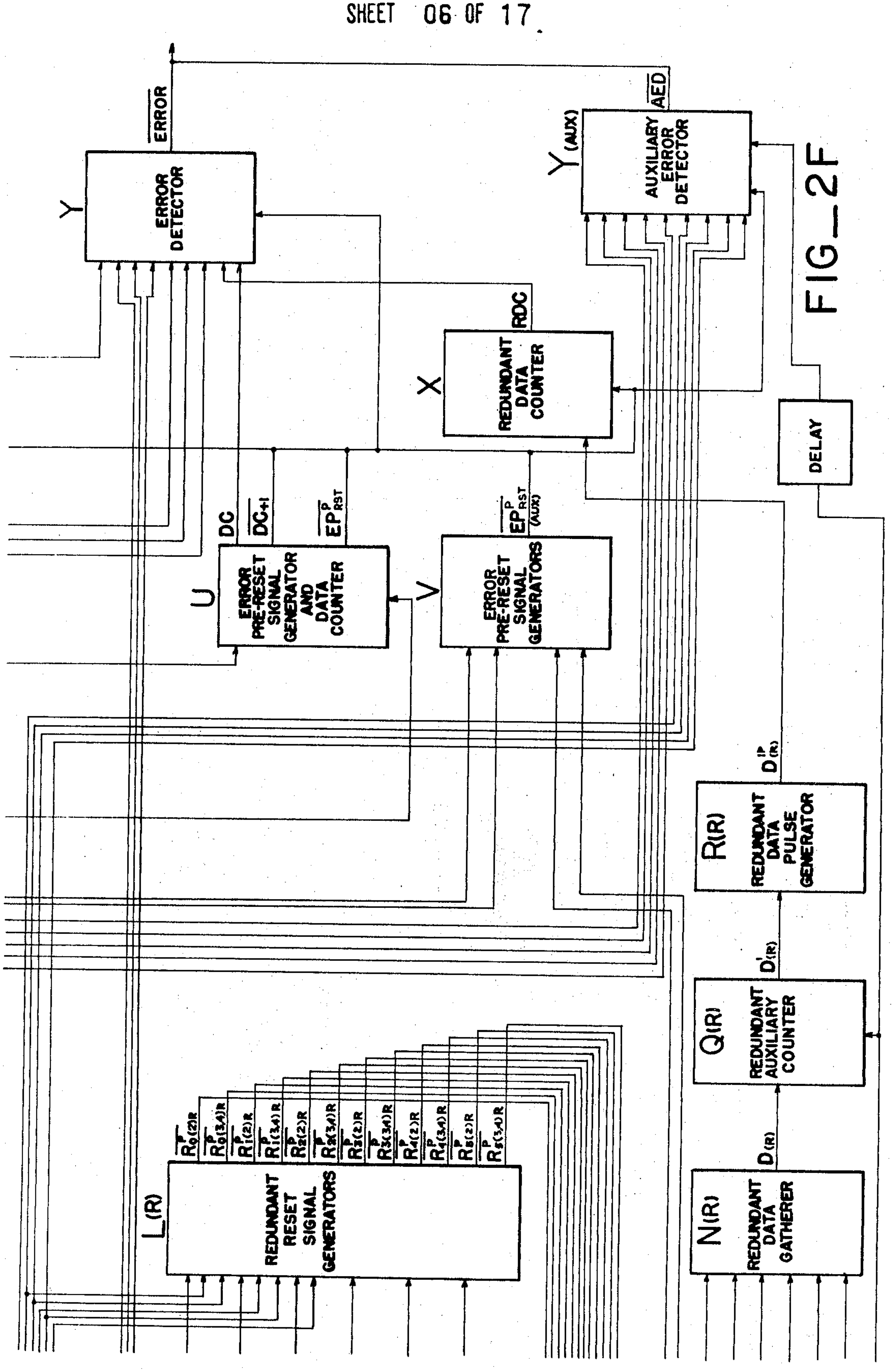

An optical character reading system embodying the principles of the present invention, as shown schematically in FIGS. 2A – 2F, comprises generally an elongated probe or wand-like device 20 that may be hand-held like a pencil with its tip close to or against a series or block 22 of printed characters that are to be scanned. The characters are part of a unique printing font 24 specifically devised for my apparatus and comprised of a number of bar shaped symbols that may be used in a coded form or as alpha-numeric characters that are human readable. This font and its derivation from the bar symbols will be described in detail below with reference to FIGS. 3A and 3B. Extending from the probe-like device 20 is a flexible conduit 26 that includes a light pipe 28 of glass fibers connected to a concentrated light source 20. Also, within the conduit are a plurality of electrical lead wires 32 that are connected to electronic logic circuitry 34 which is shown in block diagram form in FIGS. 2A – 2F. The layout for these latter figures for the block is shown in FIG. 1 to aid the reader in following the description of the circuitry and its function. Output signals from the logic circuit which are representative of the characters in a block that is scanned are produced when the tip of the probe device is moved from one end of the character block to its other end. These output signals may be supplied to a visual readout device or to various other devices such as a cash register or a data storage or computer apparatus.

Figures 4, 5, 6, 7, 8:
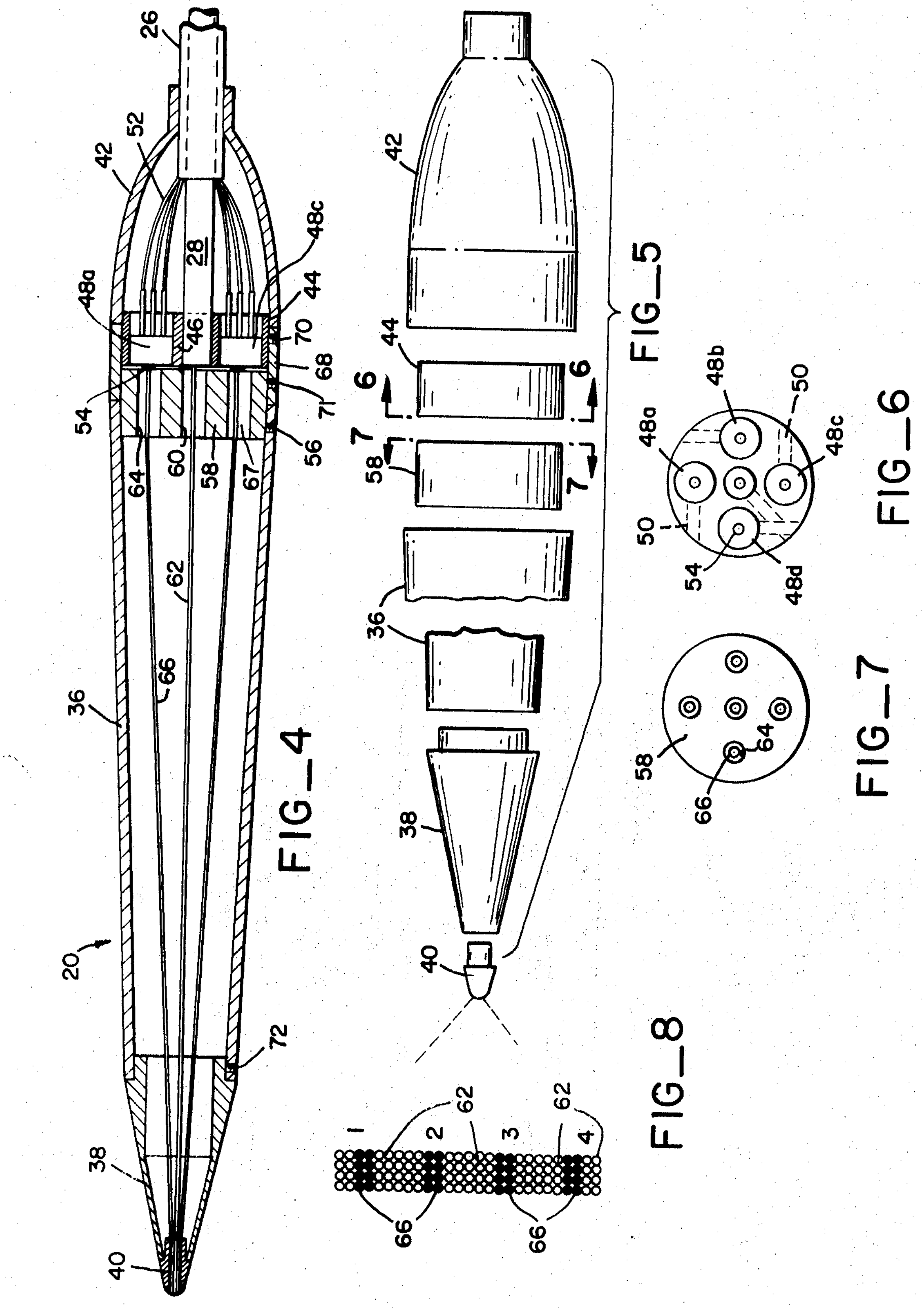
FIG. 4 is a view in elevation and in section of a character reading probe for my system according to the present invention.
FIG. 5 is an exploded view in elevation of the probe shown in FIG. 4 with a portion of one section broken away to conserve space.
FIG. 6 is a view in section taken along the line 6—6 of FIG. 5.
FIG. 7 is a view in section taken along the line 7—7 of FIG. 5.
FIG. 8 is an enlarged end view of the tip of the probe shown in FIG. 5.

The probe device 20 in the form shown in FIGS. 4 – 8 comprises a relatively long tapered main body 36 with a conical section 38 on its forward end that supports a tip member 40 and a smaller body section 42 on its rear end that receives the conduit 26. The main body may be hollow or tubular and made of some light metal or plastic material. The conduit 26 extends axially through an opening in the small end of the rear body section 42 and up to an internal cylindrical plug-like support member 44 preferabY made of some non-conductive material such as a solid plastic, that is fixed as by a press fit, within the other end of this rear body section. The light pipe 28 within the conduit 26 is comprised of a bundle of a relatively large number of light transmitting glass fibers and is retained within a central axial bore 46 in the plug member 44 by suitable means such as an adhesive compound. The ends of the fibers in the bundle 28 are flush with the surface of the plug members. Surrounding this bore are four equally spaced apart photosensitive transistors 48 *a*, 48*b*, 48*c* and 48*d* or some other equivalent light sensitive elements such as photo-diodes which are each retained within a recess by a set screw 50, as shown in FIG. 6. Leads 52 for these photo-transistors extend rearwardly through the back side of the plug member 44 and are bundled into larger wires that lie adjacent to the light pipe 28, so that together they form the conduit 26. On the front side of the plug member 42, the phototransistors are mounted so that their light sensitive terminals 54 are all in the same transverse plane and like the light pipe 28, flush with the outer end surface of the plug member 44.

Fixed within the larger end of the main probe body 36 by a press fit or by a set screw 56 is another cylindrical support member 58 having the same diameter as the support member 44. This support member has a central bore 60 which retains a bundle 62 of light transmitting glass fibers that extend axially to the tip member 40. The fiber bundle 62 may comprise a much smaller number of fibers than the light pipe 28 because they are required to transmit light only the short distance from the light pipe to the probe tip. This feature of my probe wherein the larger light pipe 28 conveys adequate light to the probe from a remote light source has several important advantages, some of which may not be readily apparent. First of all, it eliminates the necessity of having such a "hot" light source within the probe which is not practical because of the size of the probe and problem of cooling. However, even more important is the fact that use of the light pipe from a remote light source enables light of sufficient intensity to be transmitted efficiently to the probe as cold, intense light. This, in turn, makes it possible for the intense light to be transferred to the probe tip by the relatively short fibers 66 with maximum efficiency. This causes the reflected light also to be of high intensity, and therefor only a relatively few sensing fibers in each probe opening are required to provide adequate signals for the photodetectors. Thus, the probe openings can be relatively small in area and this factor allows greater skewing tolerances during scanning. Other advantages of using the light pipe from remote "hot" light sources are that it eliminates any failure of the device due to breakage of a few fibers in the light pipe, it enables the relatively few light transmitting and reflective light sensing fibers within the probe to be easily installed and well protected from any harsh environment, and it allows these short fibers to be made from various light transmitting fiber materials because losses in them will be negligible.

When the probe is assembled, as shown in FIG. 4, the inner end of the light bundle 62 is aligned with and adjacent to the light pipe 28 so that it can transmit the required amount of "cold" light to the probe tip. Surrounding the light fiber bundle 62 are four separate bores 64 each retaining the ends of a series of reflected-light transmitting glass fibers 66. The ends of these latter fibers, held firmly in each bore 64 by a suitable adhesive 67 are positioned on and flush with the outer end surface of the support member 58 so that the fibers at the surface of each group 66 will emit reflected light (See FIG. 7). The length of the support member 58 is such that when installed, a portion extends axially so that its end surface will bear flush against the surface of the support plug 44 when the main and rear body sections 36 and 42 are connected. A tubular band 68 fits around the adjacent support members 44 and 58 and between the main and rear probe sections 36 and 42. A pair of set screws 70 and 71 extend through the wall of this band and radially into the extended portions of support members 44 and 58 respectively, thereby holding these members and the connected main and rear body sections of the probe together. Before these latter set screws are tightened, the main probe body and its support member 58 are oriented in a predetermined position with respect to the rear body section and its support member 44 so that the light emitting fibers 66 at each of the bores 64 will register with and contact directly the proper light sensing phototransistors 48*a*, 48*b*, 48*c* and 48*d* and the light bundle 62 will align with the light pipe 28, as previously described.

Fixed within the smaller end of the main probe body is a cylindrical portion of the conical section 38 which may be held in place by another set screw 72. This conical section could be made integral with the main body section, if desired, and it tapers rather sharply to a smaller end which supports the tip member 40. In the form shown in FIG. 5, the tip member has a mushroom shape with a cylindrical portion that is secured in the small end of the conical section. Extending within the tip member is the central bundle of direct light transmitting fibers 62 and each of the four different groups 66 of reflected-light transmitting fibers. At the outer end surface of the tip member in accordance with the embodiment of FIG. 8 (shown greatly enlarged), the four groups of reflected-light transmitting fibers 66 are spaced apart in a slot at four different locations or windows which shall be labeled 1, 2, 3 and 4 for future reference. In the three spaces between these windows and at the outside of windows 1 and 4 are located the ends of equal numbers of the direct-light transmission fibers 62 from the central bundle which emit light from the end of the probe. Thus, the tip of the probe provides four equally spaced apart windows 1, 2, 3 and 4 each with means for sensing or receiving reflected light and adjacent means for emitting light. Both the light emitting and sensing fibers may be glass fibers of the type that are commercially available. Within the tip slot these fibers are held together and in position by a suitable adhesive such as an epoxy. Each light sensing group may consist of eight to 12 glass fibers of equal diameter (e.g., 0.2 mils), while each light emitting bundle between the windows may consist of 20 – 25 fibers.

The probe tip 40 may be made from any suitable material such as a non-conductive solid plastic and it may be secured in the small end of the probe cone by an adhesive such as an epoxy material. To ease the manipulation of the probe during use, the outer end of the probe tip member preferably has a gentle curvature as shown which does not affect the spacing between the light sensors.

The Printing Font

Figures 3A, 3B:
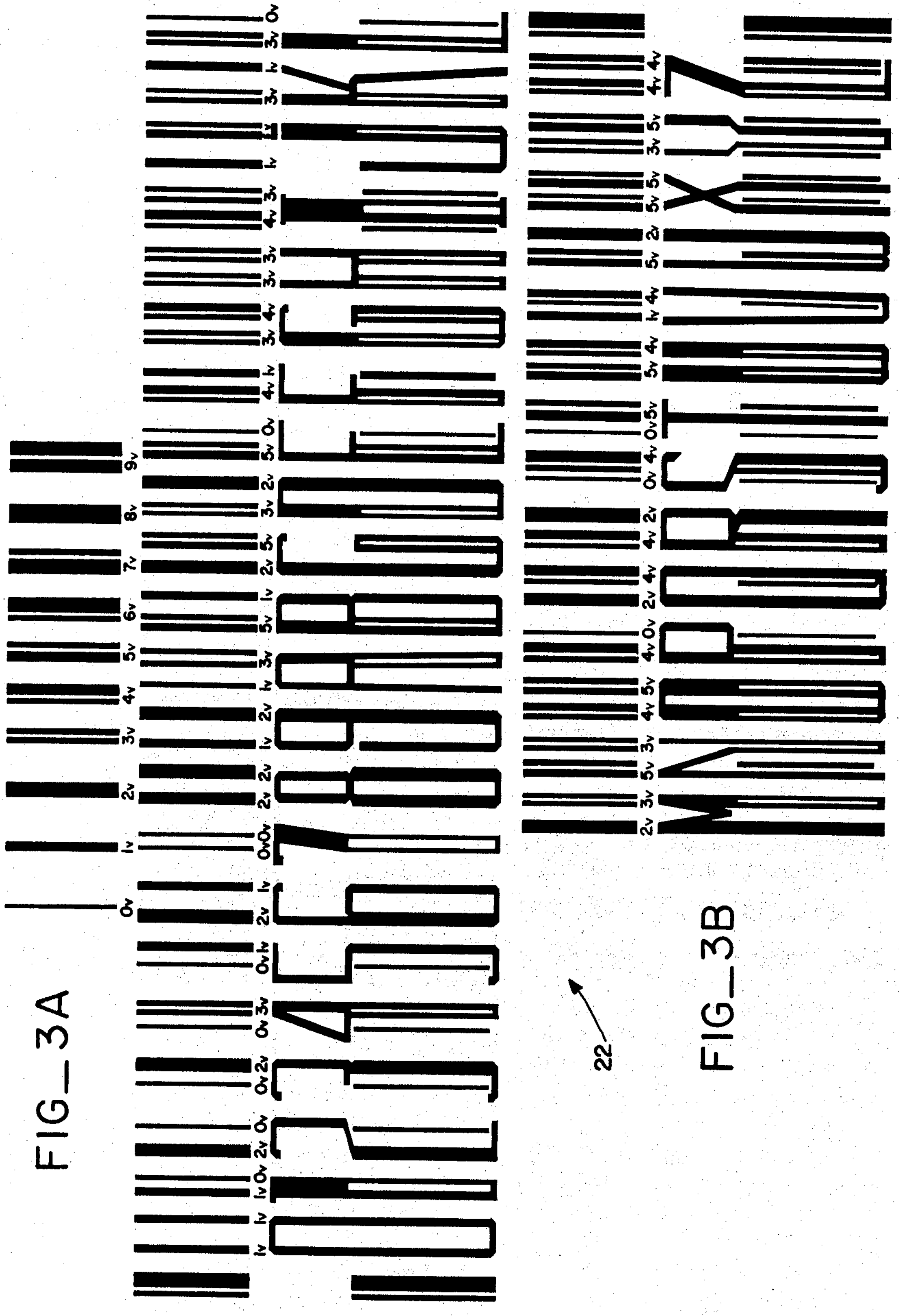
FIG. 3A shows the bar code variables used for forming characters to be use with my system.
FIG. 3B shows a printing font comprised of a series of bar code characters derived from combination of the variables of FIG. 3A with a human-readable alphanumeric character derived from each bar code character.
Figure 10:
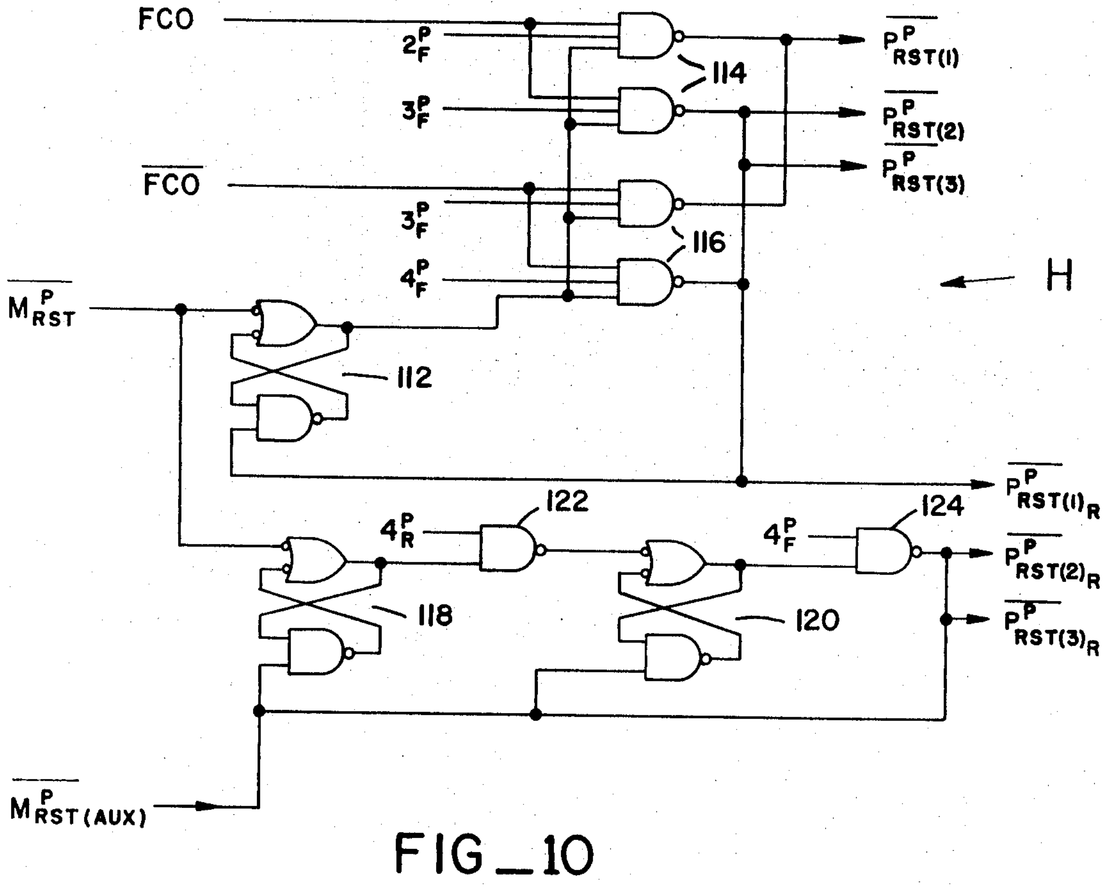
FIG. 10 is a logic diagram of the pre-reset signal generator circuit H.

In accordance with my invention each reflective light-receiving means such as the ends of the light transmission fibers 66 in the four windows of my probe device 20 will function with its associated phototransistor to produce electrical pulses as the probe tip is moved across adjacent reflective and non-reflective bar-like surfaces. As part of my invention, I have devised a printing font 22 comprised of chracters using various combinations of such reflective and non-reflective surfaces derived from a series of bar code symbols or variables. These characters can be printed in a code form or in a form that is human readable as well as readable by the probe device through the logic circuitry which will be described later. As shown in FIG. 3A, 10 variables are available for use in the font which are designated as 0*v*, 1*v*, 2*v*, 3*v*, 4*v*, 5*v*, 6*v*, 7*v*, 8*v* and 9*v*. Four of these variables are formed from combinations of two single bars spaced apart. To provide printing that is readable both by humans and by a probe and to achieve an optimum printing density (e.g. nine – 10 characters per inch), I have found that the widths of the variables should be as follows: 0*v* is a bar 4 – 6 mils wide; 1*v* is a single bar 15 – 20 mils wide; 2*v* is a single bar 27 – 32 mils wide; 3*v* is a pair of bars 8 – 10 mils wide with a 8 – 10 mils space between; 4*v* combines a 8 – 10 mil bar and a 17 – 20 mil bar with a 8 – 10 space between; 5*v* is the same as 4*v* but in reverse order; 6*v* is a 10 mil bar and a 27 – 30 mil bar with a 8 – 10 mil space between; 7*v* is the same as 6*v* but in reverse order; 8*v* is a bar 37 – 42 mils wide; and 9*v* is a pair of 2*v* bars spaced 8 – 10 mils apart. Using the variables 0*v* – 5*v*, reading from left to right in different combinations of two, I am able to provide 36 different bar code symbols. In FIG. 3B, these 36 bar code symbols are shown with portions added to their upper and lower ends to form 36 distinctive human readable characters including the arabic numbers 0 – 9 and the alphabet letters from *a* to *z*. These characters are clearly distinguishable and readable by the human eye when printed with a spacing of nine – 10 characters per inch and type having a height of one-fourth to three-eighths inches. The character density allows for a spacing of 18 – 20 mils between characters in each block. The variables 6*v* and 7*v* as shown in FIG. 3A are forward reset and backward reset variables comprised of two bars of different widths. As will be seen in the description of the logic circuitry below, these reset symbols are provided at the forward and backward ends respectively of each character block and they serve to control the logic circuitry so that it will produce a correct output despite the scanning direction or orientation of the probe.

The variables 8*v* and 9*v* are not needed to provide the full alpha-numeric printing font, but may be used for characters or symbols such as dollar signs or various punctuation marks. Such additional characters using variables 8*v* and 9*v* have not been shown, in order to conserve space.

The Electric Circuitry — General

Output signals produced from the probe as its four windows scan the reflecting and non-reflecting areas of a character block made up of characters from my printing font are fed to electronic processing circuitry comprised of various components. These components function to detect and determine probe orientation and direction of travel with respect to the font; character identification; memory or data storage; and error checking, ultimately producing outputs for activating a visual readout of the character block or some other computing or data storage apparatus. These circuitry components are designated in FIGS. 2A – 2F as blocks A – Z with appropriate interconnections.

Probe Orientation and Pre-resetting

Turning to FIG. 2A, electronic signals generated by the four photo-detectors 68 for the four probe windows 1, 2, 3 and 4 are supplied as inputs 1*in*, 2*in*, 3*in* and 4*in* to a series of preamplifiers A which serve to boost the strength of these raw signals as well as to remove excessive noise and unwanted portions from them. From the preamplifiers, the trimmed signals 1*p*, 2*p*, 3*p* and 4*p* are sent to a series of operational amplifiers, shown as block B. Here, the signals are greatly amplified to provide square wave shaped output signals 1*o*, 2*o*, 3*o* and 4*o* which are sent to a series of buffer stages C that provide four logic compatible output signals 1B, 2B, 3B and 4B for the logic circuitry. The outputs 2B and 3B derived from the windows 2 and 3 of the probe are sent to rising and falling edge pulse generators in a circuit designated as the box D. These generators are simple one-shot pulse generators (similar to ones shown in block G) which can be made to generate pulses at the rising and falling edge of any signal applied to their input. These output pulses are shown on block D as $2^P_{BR}$, $2^P_{BF}$, $3^P_{BR}$ and $3^P_{BF}$. (P signifies "pulse"; B signifies "from buffer"; R signifies "rising" and F means "falling"). Thus, the symbol "$2^P_{BR}$" simply means that a small one-shot signal is obtained from the rising edge of the buffer pulse derived from the second probe opening as it moves from a reflective area to a nonreflective area, and similarly "$2^P_{BF}$" means that a pulse is obtained from the falling edge of the second probe opening as it moves off of a non-reflective area.

These four signals from D in conjunction with the buffer output signals 1B, 2B, 3B and 4B are then applied to a "directional and master reset signal generator" circuit designated as box E. This circuit produces outputs for identifying which of the reset code characters 6*v* or 7*v* in the front and back of the character block has been scanned, and also for determining which of the four probe openings 1 or 4 sees the first non-reflective part of the character block first. It also produces a master reset signal for pre-resetting certain functional elements of the logic circuitry to an initial state before scanning of the other characters takes place. These output signals enable the system to produce a final readout or output of a character block with the characters in the proper order even though scanning is done in any one of four possible ways, namely (1) left to right; (2) right to left; (3) left to right with the character block upside down; and (4) right to left with the character block upside down. In other words, circuit E determines which of these four scanning possibilities were applied for reading a reset character 6*v* or 7*v*.

Figure 9:
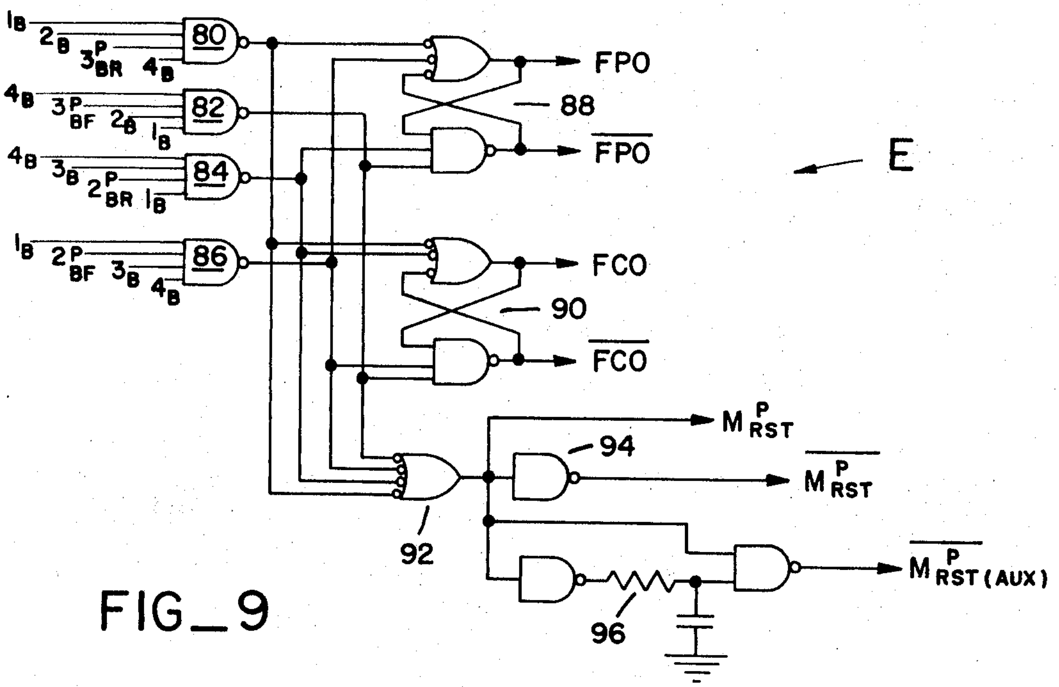
FIG. 9 is a logic diagram of the directional and master reset signal generator circuit E.
Figures 18A, 18B, 18C, 18D, 19:
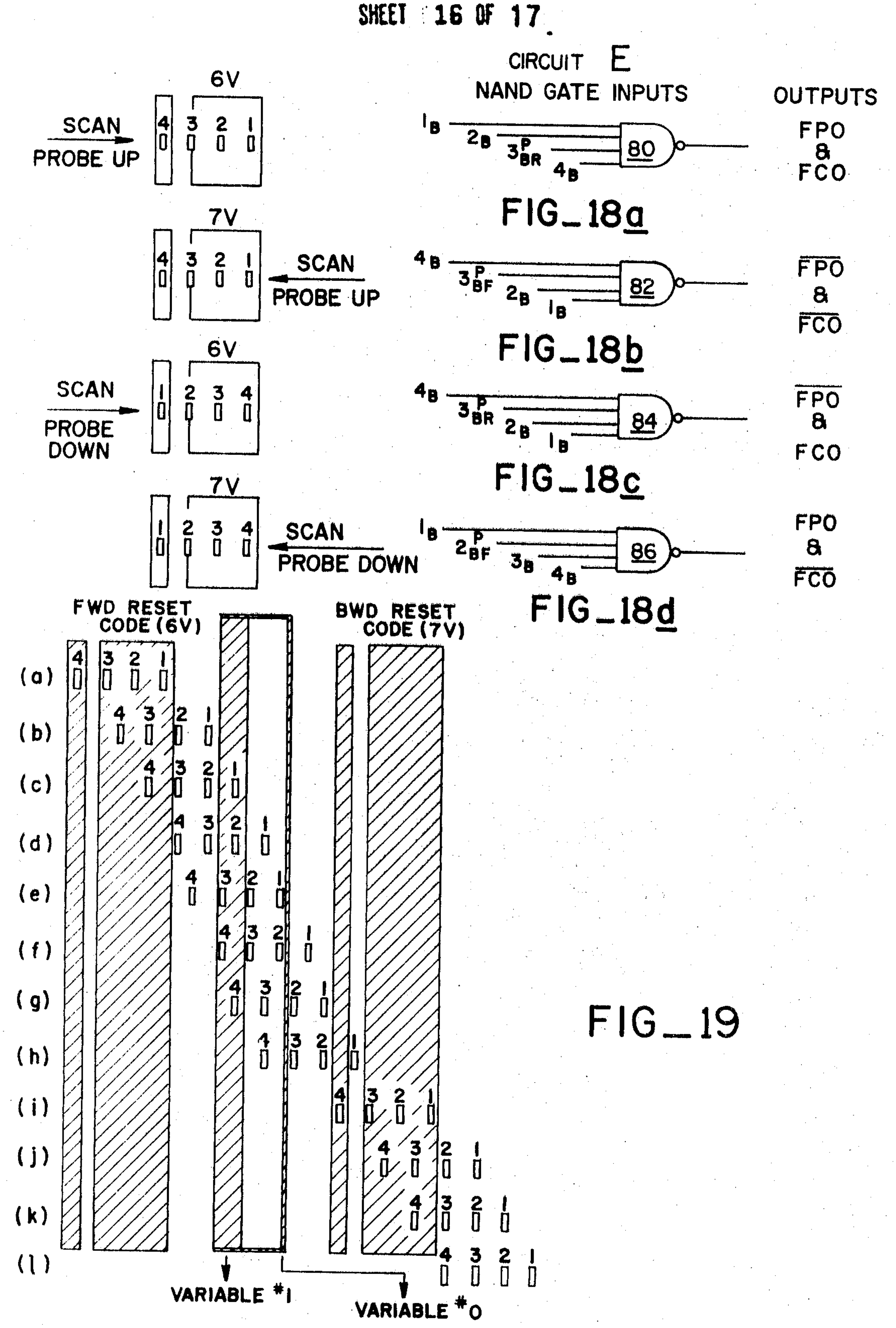
FIGS. 18a – 18d are diagrammatic views for explaining the operation of circuit E.
FIg. 19 is a diagrammatic view for explaining the operation of my system in reading a character.

As shown in greater detail in FIG. 9 circuit E utilizes four nand gates 80, 82, 84 and 86 which receive the aforesaid inputs from the circuits C and D. The outputs of these nand gates are sent to two latch logic circuit elements 88 and 90. The outputs of the first latch logic element 58, shown as FPO (forward probe orientation) and its complement $\overline{\text{FPO}}$ (backward probe orientation), determines which opening (1 or 4) saw the first non-reflective area of the character block first. The second latch element 90 determines an output according to which of the reset variables 6*v* or 7*v* was scanned first. The logic function of circuit E may be readily understood by reference to FIGS. 18*a* – 18*d* which show schematically an overlay of the probe windows on a reset symbol 6*v* or 7*v* in various positions. In FIG. 18*a*, the probe windows are in a position on a reset variable which will activate the nand gate 80. Through normal logic operation, the latch 88 will produce an FPO output, which indicates that the No. 1 window of the probe has been the first one to see the character block. The other latch 90 will produce an FCO output which indicates that the reset variable 6*v* was scanned in the normal left to right direction. If the probe was held in the same position but approached the reset variable 7*v* at the other end of the character block, the position of the windows on the variable 7*v* would have been as shown in FIG. 18*b*. This would activate nand gate 82 to produce a latch output $\overline{\text{FPO}}$ indicating that window No. 4 was first to "see" the character block; and an output $\overline{FCO}$ from the other latch 88 indicating that reset variable 7v was scanned. If the probe windows or font is turned upside down with respect to the other and the probe is moved in the normal left to right reading direction as shown in FIG. 18c, the latch outputs $\overline{FPO}$ and FCO will be produced by the nand-gate 84 indicating that window No. 4 was first to see the character block and that reset variable 6v was scanned. Similarly, in FIG. 18d the nand gate 86 inputs produce latch outputs FPO and $\overline{FCO}$ which indicate that probe window No. 1 was first to see the character block and the reset variable 7v was scanned first.

A master reset pulse "$M_{RST}P$" is also obtained from nor logic operation in the circuit E represented by a nor gate 92 which receives the outputs of all four of the nand gates 80, 82, 84 and 86. This master reset signal and an inverted master reset signal $\overline{M_{RST}P}$ obtained by an inverter 94, are used for pre-resetting most of the essential functional elements of the logic circuitry. The master reset pulse $M_{RST}P$ is applied to a variable encoding circuit K through block Z (inverters) in a primary logic section and to a similar circuit K in a redundant section of the logic circuitry. The inverted master reset signal is sent to a pre-resetting circuit H as well as other components such as Q, $Q_R$ and U, which will be described later. As shown in FIG. 9, an inverted auxiliary master reset signal $\overline{M_{RST}^P}$ (AUX) is obtained by means of a one-shot circuit 96 on the rising edge of the master reset signal and is also supplied to the circuit H together with the signals FCO and $\overline{FCO}$ from the circuit E.

Figure 11:
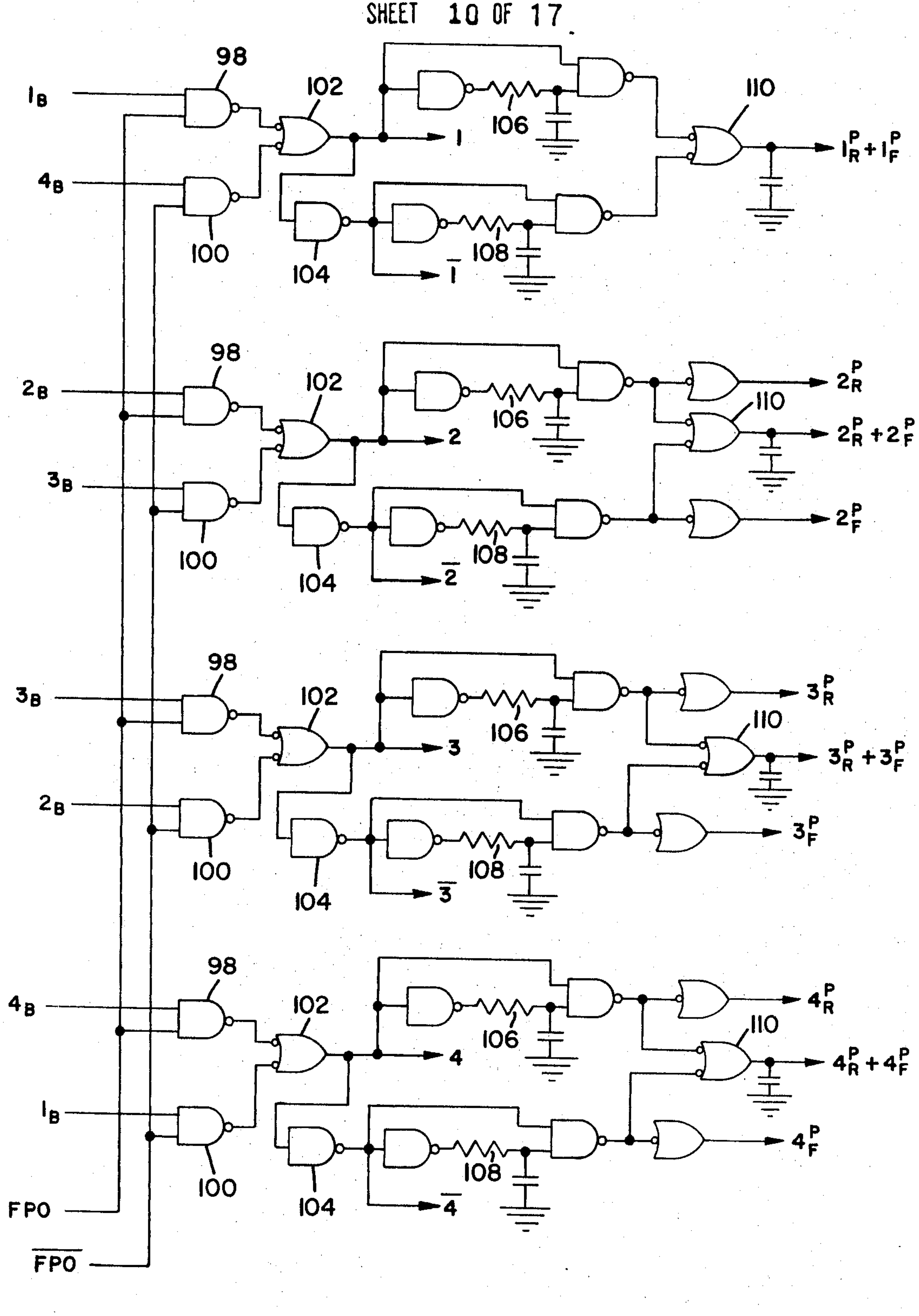
FIG. 11 is a logic diagram of the multiplexor circuit F and pulse generator circuits G.

The FPO and $\overline{FPO}$ signals from the circuit E which identify the probe openings that saw the first non-reflective area of the character block first are sent to a multiplexor F where they are used to put the incoming signals in the proper order for reading the character block despite the relative position of the probe and block or the direction of scanning. As shown in FIG. 11, the multiplexor comprises a first series of four nand gates 98 which are connected in parallel to the FPO input and also receive inputs from the buffer C in a 1, 2, 3, 4 order. A second series of nand gates 100 receives the $\overline{FPO}$ input in parallel and buffer inputs in a 4, 3, 2, 1 order. The outputs of both series of nand gates are supplied to a set of four nor gates 102 which produce outputs whenever either set of nand gates 98 or 100 is enabled. Thus, the logic circuitry following the multiplexor F will always see the signals derived from the probe openings in the right order, with the nominal No. 1 opening being the actual probe opening 1 or 4 that sees the first non-reflective area first.

The four true outputs of the multiplexor F are provided with their complements by means of inverter gates 104 and are designated as 1, $\overline{\mathbf{1}}$, 2, $\overline{\mathbf{2}}$, 3, $\overline{\mathbf{3}}$ and 4, $\overline{\mathbf{4}}$. These outputs are supplied to a circuit G which is similar to the circuit D and comprise pairs one-shot pulse generatores 106 and 108 that produce rising and falling edge signals as each probe opening scans over a non-reflective bar. The outputs of each pair of one-shot pulse generators is supplied to a nor gate 110 which produces a pulse rising or a pulse falling signal. Three output pulses ($1_R^P + 1_F^P$), ($2_R^P + 2_F^P$) and ($3_R^P + 3_F^P$) derived from the signals of the first three probe openings are sent to a code generating circuit I of the primary character identifying section of the entire circuit. These three output pulses ($2_R^P + 2_F^P$), ($3_R^P + 3_F^P$) and ($4_R^P + 4_F^P$) from G are sent to another code generating circuit $I_R$ of a redundant character identifying section of the entire circuit. This redundant section functions to provide error checking, as will be explained later.

Figures 12, 13:
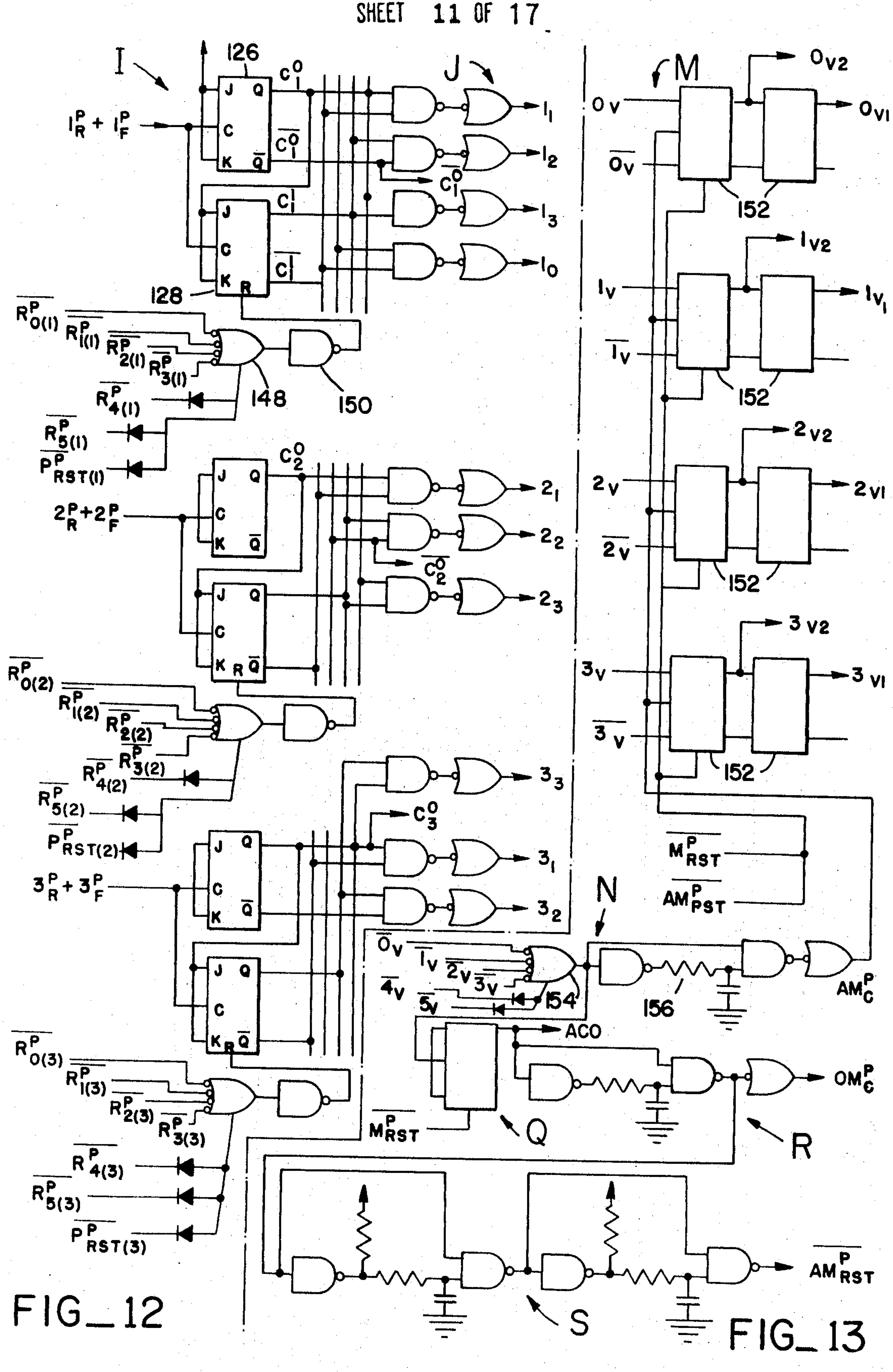
FIG. 12 is a logic diagram of the code-generating counter circuits I and encoders J.
FIG. 13 is a logic diagram of the auxiliary memory circuit M, the data gatherer circuit N, the auxiliary counter Q and the output memory clock generator R.

The circuit I, as shown in FIG. 12, comprises three primary circuit counters for counting the edges of each variable in a character block that is seen by each opening as the probe scans them. This information is later combined with the signals from the probe opening for the identification of the variables, as will be explained later. For this identification process, it is necessary to pre-reset the counters to initial values before the scanning of the variables or characters commences. The first pre-reset signals are provided by the circuit H. Later, as each variable is scanned the counters must again be reset to their initial state, and reset signals for doing this are generated by a circuit L.

The pre-resetting circuit H simiply looks at which reset variable 6v or 7v is scanned first and then generates pre-reset pulses accordingly as each probe opening leaves the reset character one by one. As shown in FIG. 10, it comprises two sections, the first of which is used to pre-reset the three counters of the primary reading circuit I together with the first counter of the redundant reading circuit $I_R$. A second section is used to pre-reset the second and third counters of the redundant circuit. The first section has a latch 112 which is set by an $\overline{M_{RST}^P}$ input signal. The output of this latch is supplied to two sets of nand gates 114 and 116, the first of which is controlled by FCO signals and the second of which is controlled by $\overline{FCO}$. The first set of nand gates uses a $2_F^P$ signal to provide a pre-reset signal $\overline{P_{RST}^P}(1)$ for the first counter of the circuit I; and a $3_F^P$ signal to pre-reset signal to pre-reset it second and third counters with outputs $\overline{P_{RST}^P}(2)$ and $\overline{P_{RST}^P}(3)$ and also the second counter of the redundant circuit by an output $\overline{P_{RST}^P}(2)$R. The second set of nand gates 116 are controlled by $\overline{FCO}$ signals and utilize the input $3_F^P$ to pre-reset the first counter of the primary circuit, and they utilize the input $4_F^P$ to pre-reset the second and third counters of the primary circuit I and the first counter of redundant circuit $I_R$. The latch 112 of the first section is then reset itself by the same pre-reset signal $\overline{P_{RST}^P}(3)$ that pre-resets the second and third primary counters.

The second section of the circuit H employs two latch elements 118 and 120, the first of which is set by the $\overline{M_{RST}^P}$ signal. These latch elements are also pre-reset by the $\overline{M_{RST}^P}$(AUX) signal. After this first latch element is set, its output is supplied to a nand gate 122 that also receives a $4_R^P$ signal. The output of gate 122 is then used to set the second latch 120 whose output is supplied to a nand gate 124 together with a $4_F^P$ signal. The output $\overline{P_{RST}^P}(3)$R and $\overline{P_{RST}^P}(4)$R of this latter gate is used to pre-reset the second and third counters in the block $I_R$ of the redundant reading circuit, and this same signal is used to set the first and second latch elements 118 and 120 of the second section. Thus, it is seen that the circuit H pre-resets all of the counters of the circuits I and $I_R$ despite the direction of movement of the probe and whether reset character 6v or 7v was read first.

Variable Encoding and Character Identification

As shown in FIG. 13, each of the three counters in the code generating circuit I is comprised of a pair of J-K flip-flops 126 and 128, which function to count the rising and falling edges produced as the sensing windows 1, 2 and 3 of the probe scan the variables in a character block. In other words, the clocking pulse for each counter is provided from the rising or falling edge pulse produced by the associated probe window derived from the pulse generator circuit G. For example, the pulse $1_R^P + 1_F^P$ provides the clocking input to both flip-flops of counter No. 1. One J-K flip-flop of each counter produces a zero bit binary output and its complement, and the other produces a one bit output and its complement. These outputs, designated as $C_2^0$, $\overline{C_2^0}$, $C_2^1$ and $\overline{C_2^1}$ for counter No. 2; $C_3^0$, $\overline{C_3^0}$, $C_3^1$ and $\overline{C_3^1}$ for counter 3 are all supplied to an encoding circuit J, (FIG. 13).

The circuit J which converts the binary counter outputs of the circuit I to decimal form comprises a series of and gates 130 which will be enabled when the connected J-K flip-flops of the circuit I have counted to a position in accordance with the number of rising or falling edge pulses received. The outputs from circuit J are designated as $1_0$, $1_1$, $1_2$, $1_3$, $2_1$, $2_2$, $2_3$, $3_1$, $3_2$ and $3_3$ wherein the numeral represents the counter for its associated probe window and the subscript denotes the number of edges counted. These outputs are supplied as inputs to the variable encoding or identifying circuit K.

Figure 14:
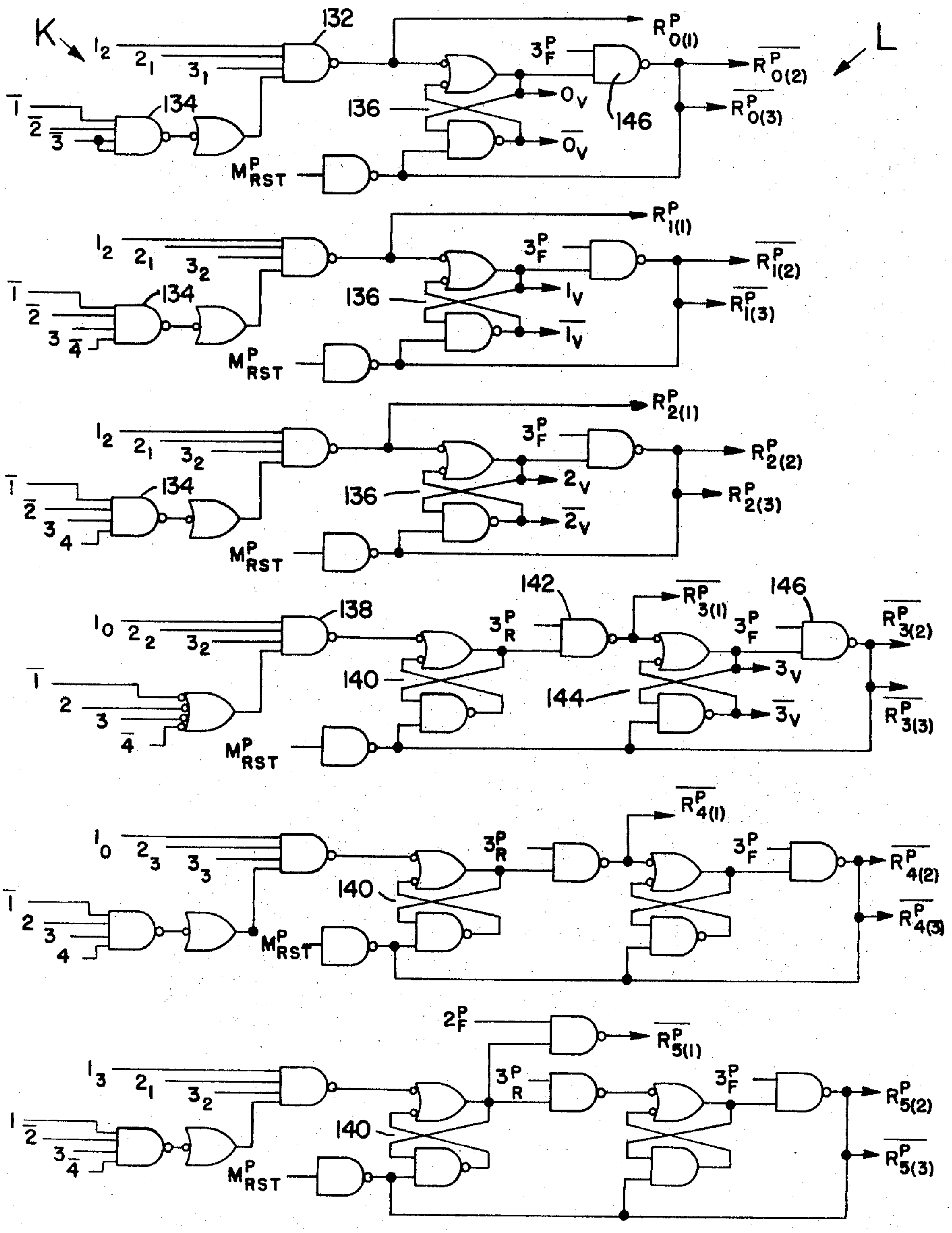
FIG. 14 is a logic diagram of the variable encoders K and the reset signal generators L.

The variable encoding circuit K comprises six independent circuits, each assigned to the identification of one of the six variables 0*v*, 1*v*, 2*v*, 3*v*, 4*v* and 5*v*. As shown in FIG. 14, the first three circuits for the variables 0*v*, 1*v* and 2*v* comprise two nand gates 132 and 134 and one latch element 136 each connected in accordance with well known logic circuit principles. The nand gates of each variable encoding circuit are precoded so that when certain predetermined inputs from the counters of circuit I are received along with the position of the probe openings at that instant from the multiplexor F, the gates 132 and 134 will be enabled to set the latch element 136 for the circuit. The same output signal that sets the latch element (in the circuits for variables 0*v*, 1*v* and 2*v*) is used to reset the first counter of the I circuit. After the latch element is set, the true and complemented latch outputs $0v$, $\overline{0v}$, $1v$, $\overline{1v}$, $2v$ and $\overline{2v}$ are supplied to an auxiliary memory circuit designated as block M. For the variables 3*v*, 4*v* and 5*v* the variable circuits in the block K are each comprised of a nand gate 138 for receiving inputs from the three counters fo the block I and the probe opening position signals from the multiplexor F. The output of this nand gate is supplied to an auxiliary latch element 140 for producing a pre-identification signal. This is necessary because the variables 3*v*, 4*v* and 5*v* are comprised of two spaced apart bars instead of a single bar and therefore will cause twice as many edge pulses to be produced by the probe openings. Normally, this would cause a premature reset signal to be produced when the third opening for the primary reading section (and the fourth opening for the redundant reading section) sees its first falling edge of the variable. To prevent this premature reset signal, the output of the first latch element is combined with a pulse rising signal for the third opening ($3_R^P$) through a nand gate 142 to set a second latch 144, thereby essentially skipping the first falling edge signal of the third variable. An important feature here is that the auxiliary latch element 140 eliminates the generation of double clock pulses for the variables 3*v*, 4*v* and 5*v* comprised of the spaced apart nonreflective bars. Thus, these variables are essentially treated as single bar variables and thus greatly expand the number of characters that are formed from these variables and readable by the present invention.

The outputs of the second latch 144 are the encoded signals for that particular variable which are then supplied to the auxiliary memory M. The output of the nand gate 142 is also used to reset the counter No. 1 of the circuit I.

The resetting of the counters 2 and 3 of circuit I after the reading of each variable are accomplished by the circuit L which comprises a series of nand gates 146, each connected to the output of the last latch element in the six variable encoding circuits K combined with a pulse falling signal from the third probe opening ($3_F^P$).

It is essential to the accuracy and reliability of the system that each counter of the circuit I be reset to its initial state before its associated probe opening arrives at the next variable to be scanned. For example, in my system, as the second opening in line leaves a variable its pulse falling signal is used to reset the counter for the first probe opening. The pulse falling signal produced as the third opening leaves the variable is used to reset the second counter for the second opening as well as the third counter. This imposes the requirement that the space between adjacent variables in a character block must be larger than the space between the center lines of the probe openings. In the font 22 shown in FIGS. 3A and 3B the distance between variables is preferably around 20 mils for a probe reading device having a spacing between the edges of the probe openings of around 10 mils, with the width of the openings or window being around 4 mils.

Each time the circuit K produces an output representing one variable from one its six encoding circuits, the counters of the circuit I and the latches of the circuits of K must be returned to an initial state to be ready for identifying the next variable. This is accomplished by resetting signals produced from the block L which are supplied to a nor gate 148 on each of the three counters in the circuit I. Thus, the nor gate is connected to receive reset signals from each of the six variable identifying circuits and will be enabled by any one of these reset signals. The output of each nor gate is inverted by a nand gate 150 for use by the J-K flip-flop 128 for each counter as a reset input.

As shown in FIG. 14, the outputs of the latches 136 and 144 of the variable identifying circuits K are supplied to the auxiliary memory circuit M which comprises a two-bit shift register 152 for each of the six variables (See FIG. 13). The variable signals are put into their respective shift register and shifted from the first cell of the shift register to its second cell by a clock pulse that is generated by a block N. Thus, the auxiliary memory temporarily stores two variables at a time which will later be combined to identify a character. The block N comprises a nor gate 154 which receives the complemented outputs from the K circuit latches 136 and 144, and this output is furnished to a one-shot pulse generator 156 which generates a clock pulse on the rising edge of the signal obtained from the nor gate 154. This one-shot pulse is supplied to all of the shift registers 152 in parallel. The output of the nor gate is also supplied to a one-bit binary counter or auxiliary counter Q which receives its pre-reset signal by a master reset pulse $\overline{M_{RST}^P}$. Since this counter is always preset by the master reset pulse to an initial value it will produce an output ACO after receiving two pulses from the nor gate 154 in a toggle-like action. This auxiliary counter output is supplied to an output memory one-shot pulse generator R that produces a clock pulse ($OM_C^P$) for an output memory storage P. The complement of this clock pulse is supplied to a delayed one-shot pulse generator or an auxiliary memory reset signal generator S which produces an output $\overline{AM_{RST}^P}$. This signal is used to reset the auxiliary memory shift registers 152 after a character from the encoding or character identifying circuit 0 has been transferred to the output memory P.

Figure 15:
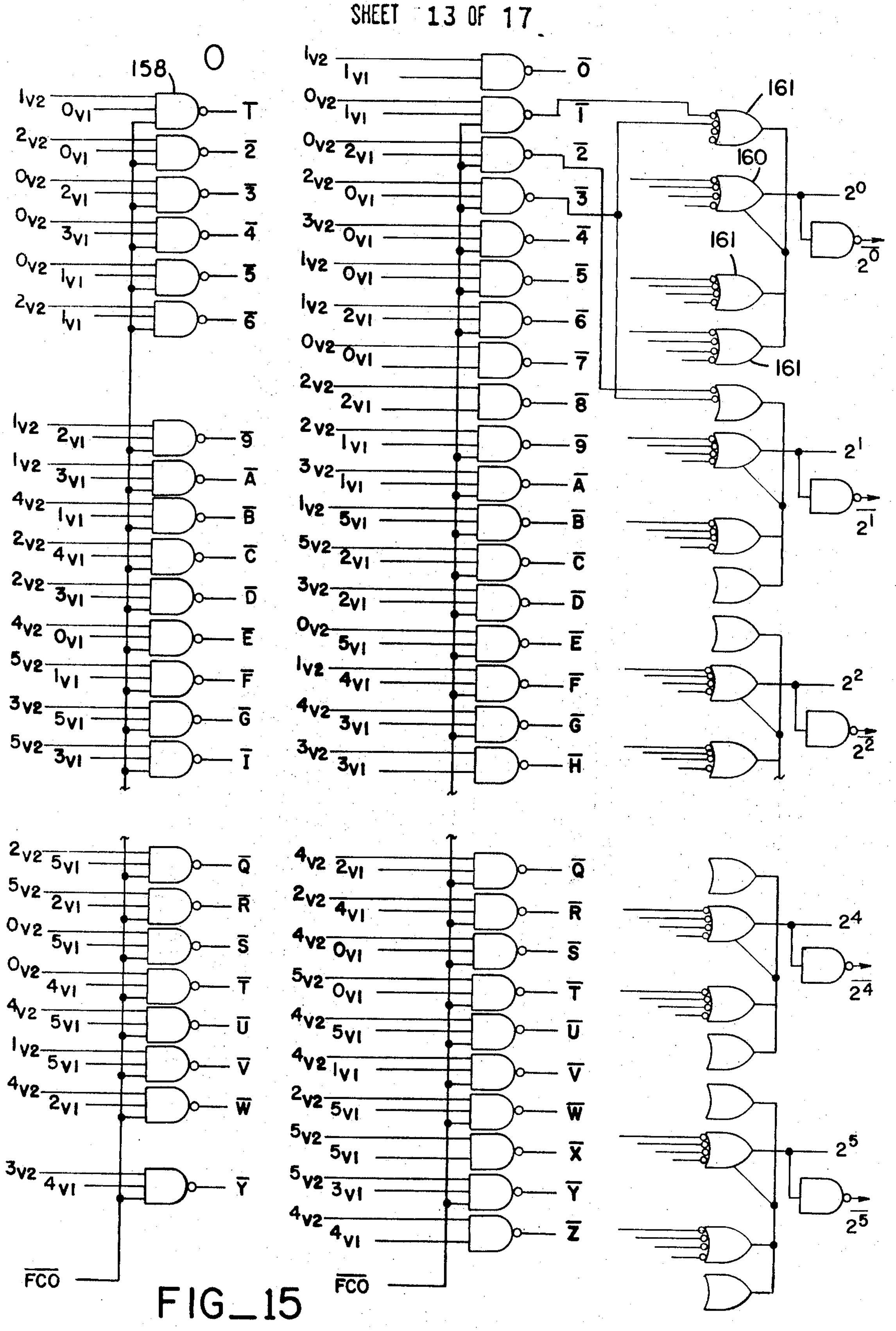
FIG. 15 is a logic diagram of the character encoder and decoder circuit O with portions broken away.

The outputs of the first shift register bit ($0v_2$, $1v_2$, etc.) in the block M and the outputs of the second shift register bit ($0v_1$, $1v_1$, etc.) are supplied to two similar encoding circuits in the block 0 (FIG. 15). One of these encoding circuits is enabled by an FCO signal produced by the circuit E to encode the characters in the normal left to right scanning direction. The other encoding circuit is enabled by an $\overline{FCO}$ signal for encoding characters when scanning is done in the reverse direction. Each encoding circuit is comprised of a series of three input nand gates 158, one input of which is the enabling signal FCO or $\overline{FCO}$. The other inputs to the nand gates are the output signals from the auxiliary memory M. One nand gate of each encoding circuit represents one character and will provide an output when its two distinctive variables are scanned and thus provided as inputs together with an enabling input.

In the block O, the outputs of both encoding circuits are supplied to a series of nor gates 160 with expanders 161 which decode the nand gate outputs of the encoding circuits into a binary form in the well known manner. This is necessary because conventional readout or data computing and storage devices operate by binary input signals.

The binary outputs from the block 0 in true and complemented form are supplied to the output memory storage P. This latter circuit P (not shown in detail) may comprise a series of shift registers which store the characters scanned by the probe during one cycle of operation and delay their release to a readout device until error checking has been accomplished.

Error-Checking

In order to provide a useful error-detecting system it is necessary to retain error information after the probe has passed the second reset code character at the end of a character block. In the operation of my system the error information is retained after the last probe opening moves off of the second reset character to a reflective area and all probe openings are on such a reflective area for a period of time (e.g., less than 1 second) which is sufficient to activate an error indicating device. The present system operates so that when no error is present in a scan, an output is produced to energize a signal light or some other indicator device. In the example shown in FIGS. 16 and 17 circuitry is provided for detecting errors in a character block of six characters. However, the principles could be applied to character blocks of more or less characters.

In order to retain the error detecting data after the probe passes the second reset code character, which normally returns all of the other system logic to its initial state, a unique error pre-reset signal $\overline{EP_{RST}^P}$ must be generated which is not affected by the master reset pulse produced by the second reset character. This error pre-reset signal is produced by two circuits designated as blocks U and V (See FIG. 16). Circuit U is a binary counter comprised of a series of J-K flip-flops 162. Supplied to these flip-flops as a clock pulse is the ACO signal from the auxiliary counter Q which occurs every time one character is scanned. Thus, as the first character of a series is scanned, the outputs of the U counters 162 are encoded for that count by a nand gate 164 and the output of this nand gate is supplied to a falling edge one-shot pulse generator 166. This signal comprises the first part of the pre-reset signal $EP_{RST}^P$ of the error detecting circuitry and it pre-resets the other parts of the error detecting circuitry, namely, blocks W, X, Y and Y(aux) so that these circuits will hold their error detecting signals after the second reset character is scanned. Outputs of the counters 162 are also encoded by a nand gate 165 to detect any extra character which may have occurred during the scanning. This portion of the error detecting circuitry is used where the number of characters in the block to be scanned is known and the gate 165 is provided with circuitry in accordance with this fact. Thus, if an excessive number of characters are scanned, the gate 165 will be enabled to indicate an error by destroying the correct output error signals.

Figure 16:
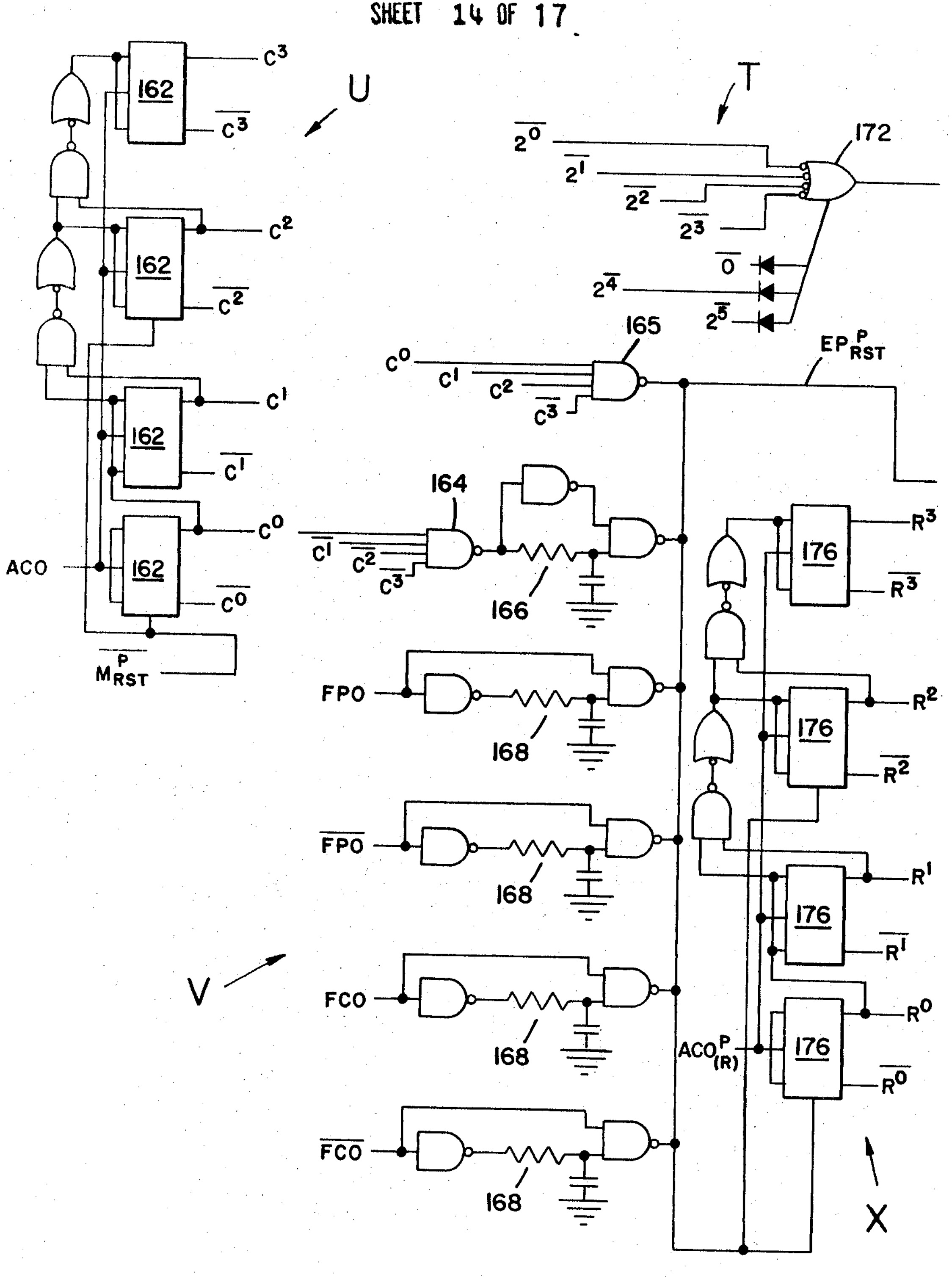
FIG. 16 is a logic diagram of the circuits U and V of the error-checking circuitry.
Figure 17:
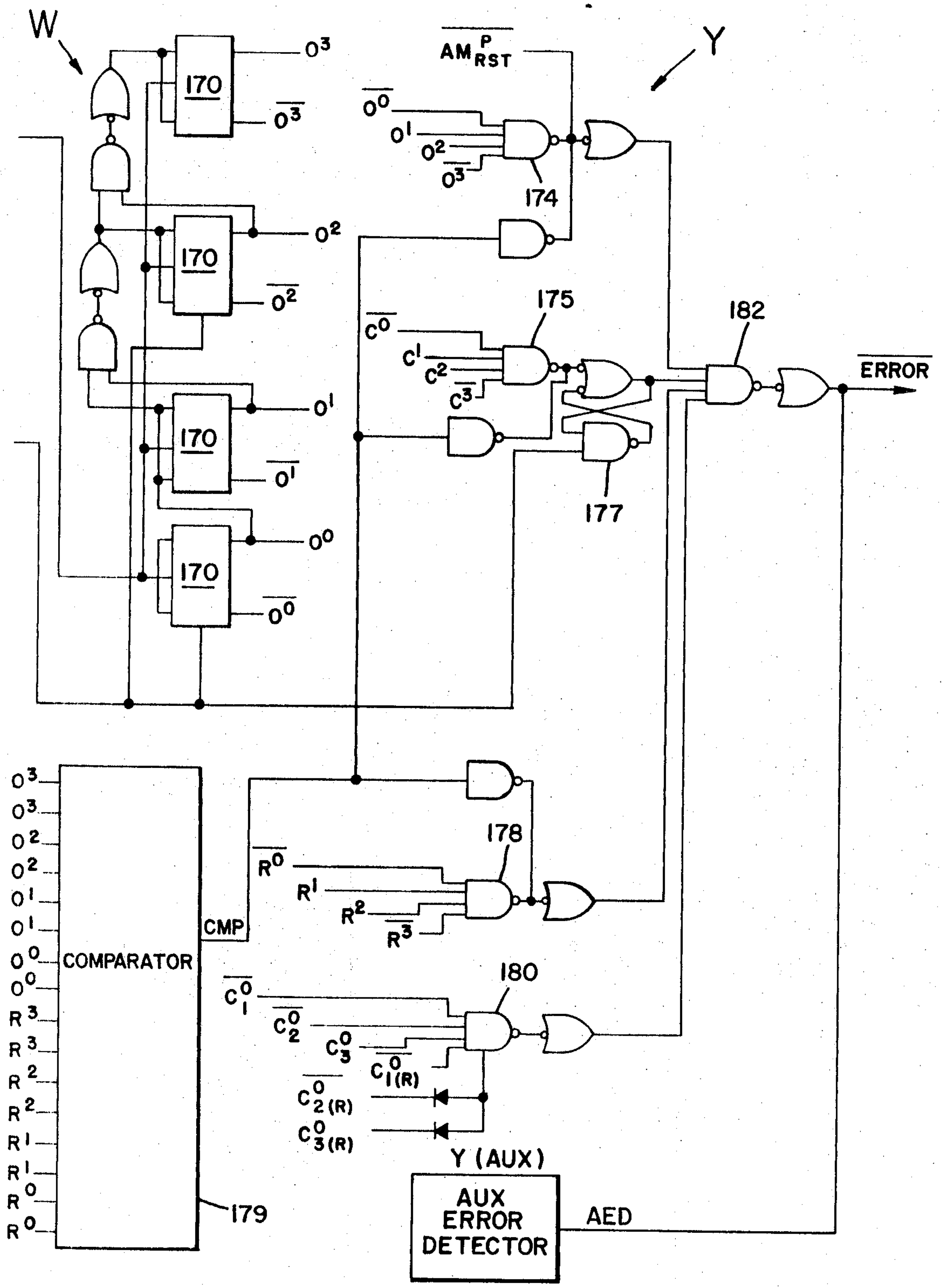
FIg. 17 is a logic diagram of the circuits W and Y of the error checking circuitry.

Another part of the error pre-reset signal $EP_{RST}^P$ is provided by the block V which comprised a series of four, one-shot pulse circuits 168 which are activated by the FPO, $\overline{FPO}$, FCO, $\overline{FCO}$ signals from the circuit E. The outputs of these four, one-shot pulse generators are connected in direct nor orientation in parallel with each other and with the output of the one-shot generator 166 for the U counter circuit. The error pre-set signal $EP_{RST}^P$ now produced is supplied to the two other binary counter circuits W and X (FIGS. 16 and 17). The counter circuit W which comprises a series of J-K flip-flops 170 and is identical to the circuit U, is connected to and receives an input from a circuit T, an output data gatherer. This latter circuit is essentially a nor gate 172 which is connected to the outputs of the decoding circuit O and therefore produces an output each time a character is put by the circuit O into the output memory P. Thus, the circuit W is clocked by the circuit T to produce binary outputs $0^0$, $\overline{0^0}$, $0^1$, $\overline{0^1}$, $0^2$, $\overline{0^2}$, $0^3$ and $\overline{0^3}$ from its counters 170 for each character scanned. The outputs $\overline{0^0}$, $0^1$, $0^2$ and $\overline{0^3}$ are encoded by a nand gate 174 in a circuit Y to provide an output representing the correct character count for the scanning operation. In this phase of error-checking, the gate 174 is encoded for a particular number of characters to be scanned, such as six characters in the embodiment shown.

Since the counter W is pre-reset by the error pre-reset signal $\overline{EP_{RST}^P}$, it will not be affected by the master reset signal obtained by the scanning of the second or last reset code of the character block. Therefore, the output of the counter W is produced and retained as long as the probe is held on a reflective surface after scanning has been completed. If desired, the error signal could be put into a memory circuit and retained even after the probe is lifted from the reflective surface. The outputs $\overline{C^0}$, $C^1$, $C^2$ and $\overline{C^3}$ of the circuit U are also supplied to a nand gate 175 to encode the actual character count and supply it to a latch circuit 177. This is necessary because the counter circuit U is reset by the master reset pulse after the second reset character has been scanned and thereafter cannot retain its information.

The counter circuit X has a series of flip-flops 176 and operates in the same manner as the circuit W except that it utilizes the auxiliary counter output $ACO_R^P$ for the redundant circuit section of the system. The redundant circuit includes duplicate circuits or blocks for identifying the variables scanned by the probe or wand openings 2, 3 and 4. However, the outputs of this redundant circuit are not supplied to the auxiliary memory but instead are supplied first to a redundant data gathered $N_{(R)}$ which produces an output $D_{(R)}$ whenever a variable is scanned. This output is sent to the redundant auxiliary counter $Q_{(R)}$ which produces an output $D_{(R)}^1$ each time a character is scanned. The output of this latter circuit is then supplied to the redundant data pulse generator $R_{(R)}$ which furnishes its output $D_{(R)}^{1P}$ as a clock pulse to the redundant data counter circuit X. The outputs of the circuit X are supplied to and encoded by a and gate cicuit 178 to provide an output representing the correct character count read by the redundant circuitry. Thus, the output count of the redundant circuit must match the output count of the counters U and W or there has been an error in scanning and data will not be supplied to the readout or output device.

If the probe is to be used for scanning a character block having more or less characters than the number encoded by the nand gates 174 and 178, another form of error-checking may be used. Here, the outputs of the counters W and X are supplied to a comparator circuit 179 of nand and nor gates, which is shown in simple block form in FIG. 17 to conserve space. If scanning has been performed properly the counters W and X for the primary and redundant circuits will have the same outputs since they will have counted the same number of characters in the character block, and the comparator will then produce a "no-error" output signal.

Another phase of error checking is accomplished by a and gate circuit 180 which receives the outputs of the code generating counters of both the primary and redundant reading sections, namely $\overline{C_1^0}$, $\overline{C_2^0}$, $C_3^0$ $\overline{C_{1(R)}}$, $\overline{C_{2(R)}^0}$ and $C_{3(R)}^0$. Receipt of all of these signals indicates that the last reset character was read properly and therefore the intervening characters were also read properly. It also assures that the counters for both encoding circuits I and $I_{(R)}$ are returned to their initial state.

The outputs of the circuit 174, the latch circuit 177, the and circuit 178 and the and circuit 180 are connected to a and gate 182. If no error in scanning has occurred, the and gate 182 will be enabled and will produce a "no-error" signal. However, if any of the aforesaid gates fail to produce an output, an error in scanning has occurred. The and gate circuit 174 will fail to produce an output if a counter in block W fails to count the right number of characters during a scan. The gate 175 and thus the latch 177 will fail to produce an output if the counter U does not count the right number of characters. The and gate circuit 178 will fail to produce its output signal if the counters in block R do not count the right number of characters scanned by the redundant circuit. The and gate circuit 180 will fail to produce its output signal if the encoding counters of both primary and redundant reading circuits are not returned to their initial state. The "no-error" signal from the and gate 182 may be used in various ways. For example, an indicator light on a readout device can be connected to go "on" when a scanning is completed and the "on-error" has been received. If the "no-error" signal is not received the light is prevented from going on to indicate that the scan was not correct. An audio signal could be used in place of or in addition to the light signal.

An auxiliary error detecting circuit $Y_{(AUX)}$ may be utilized to provide even further error detection security. As shown in block diagram form, this circuit receives inputs from the pulse generator circuit G, the data gatherer N and the reset signal generator L. The "no-error" output of this auxiliary error detecting circuit could be used in conjunction with the other error detecting signals as another input to the and gate 182. Or, as shown, it may be hard wired to the output of the gate 182.

Figure 20:
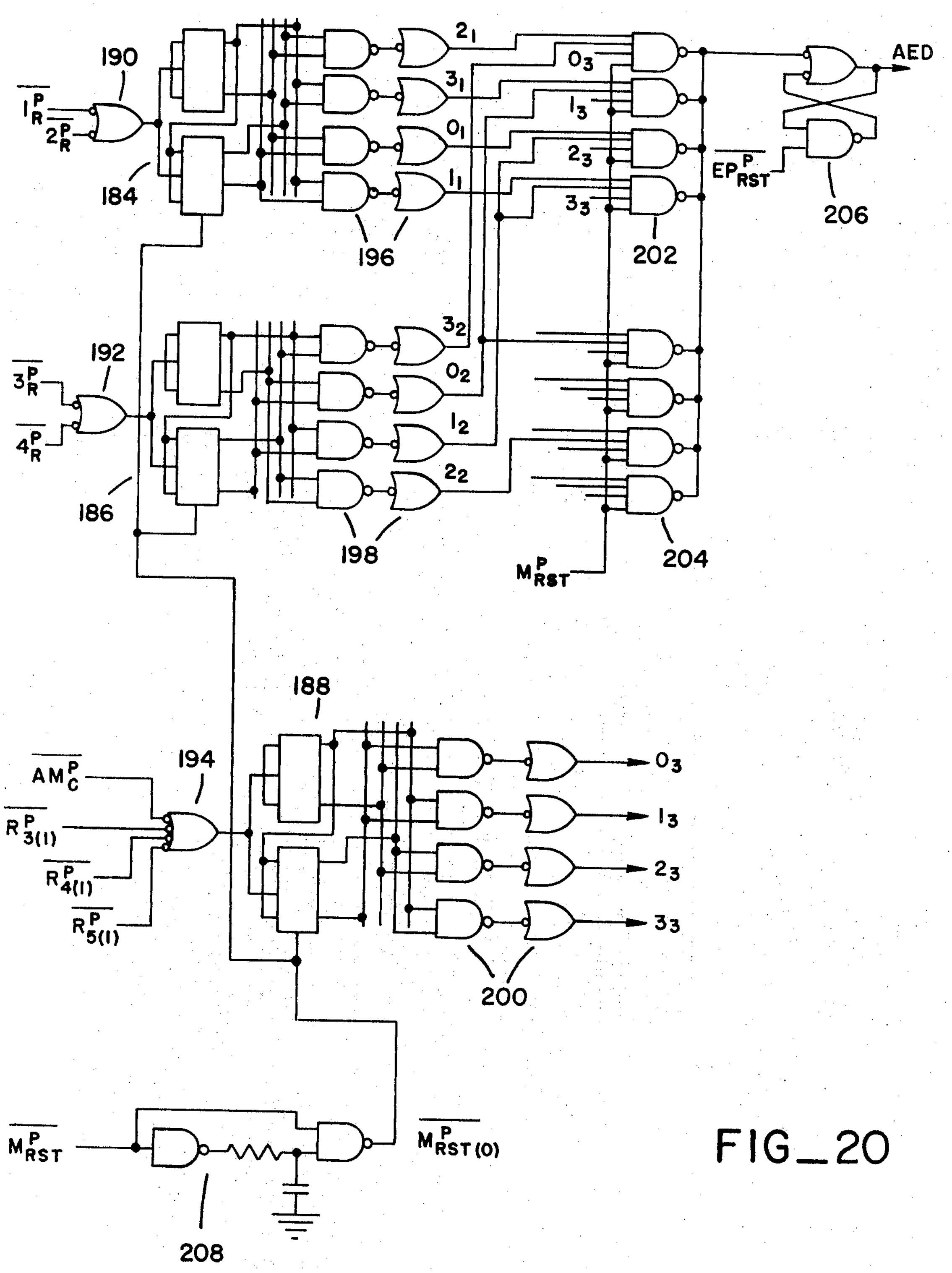
FIG. 20 is a logic diagram of the auxiliary error checking circuit.

A detailed logic circuit diagram of the auxiliary error detecting circuit $Y_{(AUX)}$ is shown in FIG. 20. It comprises three two-bit binary counters 184, 186 and 188 each having two J-K flip-flops. The first counter 184 from a nor gate 190 supplied with signals receives a clock input $\overline{1_R^P}$ and $\overline{2_R^P}$ from the pulse generator circuit G. In a similar manner the counter 186 receives a clock input from a nor gate 192 that is supplied with the signals $\overline{3_R^P}$ and $\overline{4_R^P}$ from the circuit G. Thus, the counters 184 and 186 count the rising edge pulses of the variables seen by the probe openings. The counter 188 receives its clock input from a nor gate 194 which is supplied with an auxiliary memory clock pulse $\overline{AM_c^P}$ from the circuit N and the reset pulses $\overline{R_{3(1)}^P}$ $\overline{R_{4(1)}^P}$ and $\overline{R_{5(1)}^P}$ from the circuit L. Thus, the counter 188 counts the number of rising edges of the variables seen during the scan. The outputs of the J-K flip-flops for the counter 184 are encoded in decimal form as 0, 1, 2 and 3 by a series of and gates 196. Similarly, the outputs of the counter 186 are encoded as 0, 1, 2 and 3 by the and gates 198 and the outputs of counter 188 by and gates 200. The outputs of the and gates 196, 198 and 200 are supplied to a first series of four nand gates 202 and a second series of nand gates 204. These eight nand gates are precoded so that one of them will produce an output signal when the second master reset pulse is generated as the second reset code is scanned. If the scanning in the forward direction has been performed correctly, one of the nand gates 202 will provide an output signal to set a latch 206. Similarly, one of the nand gates 204 will produce an output if scanning was done correctly in a backward direction.

Essentially, this auxiliary error checking circuit counts the rising edges of each variable seen by each probe opening using counters 184 and 186 and compares this count to the variables identified by the circuits in block K using the counter 188. The four gates 202 or 204 are encoded to represent all of the possible counts or multiples thereof of rising edges of the six variables of the font 22 as they may occur in a character block despite the number of characters included. They are also encoded to represent all of the possible numbers of variables that may be seen during a scan. When the number of rising edges seen during a scan are matched with the corresponding number of variables scanned, one of the nand gates 202 or 204 provides a "no-error" output signal to set the latch 206. The output AED of this latch, as shown in FIG. 17, is then supplied to the and gate 182, as previously described. The counters 184, 186 and 188 are pre-reset by a delayed master reset pulse $\overline{M_{RST(D)}^P}$ that is obtained from a delay circuit 208 supplied with an inverted master reset signal $\overline{M_{RST}^P}$ that occurs at the falling edge of the master reset signal, when scanned. This is necessary to enable the master reset signal to check the inputs of the coded nand gates 202 and 204 before the counters 184, 186 and 188 are reset. The latch 206 is pre-reset by the error pre-reset signal $\overline{EP_{RST}^{P}}$ obtained from the block U and V. This is done so that the information stored in the latch can be preserved after the probe has moved beyond the second reset character.

Resume of Operation

The operation of my optical character reading system may be described and summarized by reference to FIG. 19 which shows the character digit "1" from the font 22 as it would appear in a character block having front and rear reset characters 6*v* and 7*v*. Superimposed over this single character block are the four probe openings shown as they appear at various time intervals when progressively approaching and passing over the character block from left to right. These various time intervals are designated *a – k*, and I will now briefly describe the operation of the various logic circuit components at each interval.

In position *a* the probe openings are on the reset character 6*v* and the circuit E has identified this character and therefore established that the probe is moving from left to right across the character and also that its opening No. 1 was first to see this reset character. Therefore, outputs from the circuit E have put the circuitry in the forward scanning mode and all circuit components except the circuit I have been reset to their initial state and are ready to receive scanning data. In position *b* the circuit H is activated by the pulse obtained from the second probe opening as it leaves the reset character 6v. This pulse is used to pre-reset the first counter of the code-generating circuit I. In position *c* the second and third counters of the block I are reset to zero by signals from the circuit H. At this point the first counter of the redundant circuit $I_{(R)}$ is also set to zero. In position *d* the fourth opening is just leaving the reset character 6*v* and this falling pulse is used to reset the second and third counters of the redundant circuit $I_{(R)}$. Also at this point the probe opening No. 1 has advanced two edges of the variable 1v forming the character one and the count of two is stored in the first counter of the code generating block I. In the same manner, the second probe opening has seen one edge of the variable 1*v* and has advanced the second counter of block 1 by one. At this point a $3_F^P$ pulse is obtained as the third opening leaves the reset character 6*v* has advanced the third counter by one. In position *e* the second probe opening is leaving the variable 1*v* causing block G to generate a signal $2_F^P$. At this instant the outputs of the three counters of block I in encoded form have values related to the number of edges counted by the first three probe openings. These values are combined with signals from the multiplexor F which represent the position of the probe openings with respect to the variables being scanned. All of these signals in the circuit K are used to identify the variable 1*v* uniquely. After the identification of this variable, the first counter of circuit I is reset to zero and this variable is supplied to the first cell of the auxiliary memory M. Also this time the auxiliary counter Q is advanced by one.

In position *f* the third probe opening is leaving the variable 1v to produce a signal $3_F^P$ which resets the second and third counters of block I and the identifying circuitry of block K to their initial state. Also, at this instant the first probe opening has seen two edges of the variable 0*v* and has acquired a count of two; also openings 2, 3 and 4 have come to the proper position to identify the variable 1*v* for the redundant circuit. After this identification, the first counter of block $I_{(R)}$ is reset to zero and the auxiliary counter $0_{(R)}$ of the redundant circuit is advanced by one.

In position *g* the second probe opening is just about to leave the variable 0*v* and at that instant probe openings 1, 2 and 3 are in the proper position for identifying the variable 0*v*. After 0*v* is identified this variable is supplied to the first cell of the auxiliary memory M and the content of the first cell (1*v*) is shifted to its second cell. At that time, the output of the auxiliary memory cells are encoded in decimal form and decoded in binary form in the character identifying block O and brought to the output memory P in binary form. The auxiliary counter Q is then advanced again by one, and an output memory clock pulse is generated to put the information from block O into the output memory P. After the information is put to the output memory the auxiliary memory is cleared by the auxiliary memory reset signal $\overline{A\ M_{RST}^{P}}$ generated by block S.

In position *h* the probe openings 2, 3 and 4 are in the proper position for identifying the variable 0*v* for the redundant circuit and also at that instant the second and third counters of block 1 and the first counter of $\mathbf{1}_{(R)}$ are reset to zero.

In position *i* the second master reset signal is obtained by the signals supplied to block E. This reset signal is used to check the output of the auxiliary error detector and also reset the counter block U as well as other parts of the logic circuitry.

In position *j* and *k* the probe is leaving the second reset character 7*v* and the circuit H is providing reset signals for returning the counters of blocks I and $I_{(R)}$ to their initial state.

In position "1" all of the probe openings have cleared the last reset character 7*v* and a "no-error" signal is generated by the error circuitry previously described.

For character blocks having additional characters the operation of the system is the same as described but merely repetitive for each character.

The present invention provides a unique system comprised of the light hand-holdable probe, a human as well as probe readable alpha-numeric printing font and an electronic signal processing sytem that facilitates the readout of scanned data at high levels of speed, accuracy and versatility. The probe can scan a character block from either direction at any speed. It can be tilted or skewed by considerable amounts and still produce accurate results, and the error checking circuitry assures a high degree of accuracy and security of results.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A record medium for storing coded data for use in combination with a reader thereof comprising:

a record member;

a plurality of distinctive variables comprised of bars having a characteristic different from said record member, at least some of the variables being double bar variables formed of two spaced bars and including a first double bar variable formed of two spaced bars of approximately the same width and a second double bar variable wherein at least one of the bars has a width different from the width of the bars in said first double bar variable;

said variables being assigned to predetermined pair groupings, each pair grouping being formed of two spaced variables; and said pair groupings being positioned in a single track on said record member in spaced relation to each other, the spacing between the variables forming each pair grouping being greater than the spacing between bars in said double bar variables and less than the spacing between said pair groupings with all of said spacings being independent of the width of any of the bars forming said variables.

2. The record member of claim 1 wherein the bars on said second double bar variable have a width different from each other, said variables further including a third double bar variable which is substantially a mirror image of said second double bar variable.

3. The record member of claim 2 wherein the between bar spacing of the double bar variables is no greater than 10 mils and the spacing between pair groupings is greater than 10 mils but no greater than 20 mils.

4. The record member of claim 2 wherein others of said variables are formed of single bars of different widths.

5. The record member of claim 4 wherein the bar characteristic which differs from the record member is the reflectivity of the bars.

6. The record medium of claim 4 wherein three single bar variables and three double bar variables are combined in combinations of two spaced variables to provide a multiplicity of distinct pair groupings.

7. The record medium of claim 6 wherein the plurality of variables further include a pair of reset characters, each of said reset characters being comprised of a variable which is different from said three single bar and said three double bar variables.

8. The record medium of claim 7 wherein said pair of reset characters is comprised of a double bar variable and its mirror image.

9. The record medium of claim 6 wherein said variables are combined to form at least 36 distinctive pair groupings.

10. The record medium of claim 9 wherein said pair groupings have portions which extend from the upper ends of the variables to form alpha-numeric characters that are human readable.

11. The record medium of claim 10 wherein the human readable characters are spaced apart to provide from nine to 10 characters per inch.

12. A record medium for storing coded data for use in combination with a reader thereof comprising:

a record member;

a plurality of indicia forming variables comprised of bars having a characteristic different from said record member, at least some of the variables being double bar variables formed of two spaced bars and including a first double bar variable formed of two spaced bars of approximately the same width and a second bouble bar variable wherein at least one of the bars has a width different from the width of the bars in said first double bar variable;

first and second distinctive reset variables, said reset variables being different from said indicia forming variables and each other;

said indicia forming variables being assigned to predetermined pair groupings, each pair grouping being formed of two spaced indicia forming variables; and said pair groupings being positioned between said reset variables in a single track on said record member in spaced relation to each other, the spacing between the variables forming each pair grouping being greater than the spacing between bars in said double bar variables and less than the spacing between said pair groupings with all of said spacings being independent of the width of any of the bars forming said variables.

13. The record member of claim 12 wherein said reset variables comprise a double bar variable and its mirror image.

14. The record member of claim 13 wherein others of said indicia forming variables are formed of single bars of different widths.

15. The record medium of claim 14 wherein three indicia forming single bar variables and three indicia forming double bar variables are combined in combinations of two spaced variables to provide a multiplicity of distinct pair groupings.

16. The record member of claim 12 wherein others of said indicia forming variables are formed of single bars of different widths.

17. The record medium of claim 16 wherein three indicia forming single bar variables and three indicia forming double bar variables are combined in combinations of two spaced variables to provide a multiplicity of distinct pair groupings.

* * * * *